(12) United States Patent
Raad

(10) Patent No.: US 6,820,728 B2
(45) Date of Patent: Nov. 23, 2004

(54) INTEGRATED RETARDER AND ACCESSORY DEVICE

(75) Inventor: Bernard A. Raad, Oxnard, CA (US)

(73) Assignee: Pacific Scientific Electrokinetics Division, Carpinteria, CA (US)

(*) Notice: Subject to any disclaimer, the term of this patent is extended or adjusted under 35 U.S.C. 154(b) by 20 days.

(21) Appl. No.: 10/407,797

(22) Filed: Apr. 3, 2003

(65) Prior Publication Data

US 2003/0189375 A1 Oct. 9, 2003

Related U.S. Application Data

(60) Division of application No. 10/163,755, filed on Jun. 6, 2002, now Pat. No. 6,578,681, which is a continuation-in-part of application No. 09/914,284, filed as application No. PCT/US01/03030 on Jan. 30, 2001, now Pat. No. 6,543,588.
(60) Provisional application No. 60/179,900, filed on Feb. 2, 2000.

(51) Int. Cl.[7] ............................................. F16F 15/03
(52) U.S. Cl. ..................... 188/267; 188/161; 310/93; 310/105
(58) Field of Search ................... 188/267, 161, 188/158; 180/65.2, 656; 318/4, 139, 59, 61, 62; 310/93, 105

(56) References Cited

U.S. PATENT DOCUMENTS

| | | | | | |
|---|---|---|---|---|---|
| 4,864,173 A | * | 9/1989 | Even | | 310/93 |
| 5,115,693 A | * | 5/1992 | Rugraff | | 74/606 R |
| 5,614,777 A | * | 3/1997 | Bitterly et al. | | 310/74 |
| 6,274,942 B1 | * | 8/2001 | Pels | | 290/40 B |
| 6,328,142 B1 | * | 12/2001 | Kuwahara | | 188/158 |

FOREIGN PATENT DOCUMENTS

| | | | |
|---|---|---|---|
| EP | 1193724 | * | 4/2002 |
| JP | 04088803 | * | 3/1992 |
| JP | 07074894 | * | 3/1996 |

* cited by examiner

Primary Examiner—Robert A. Siconolfi
Assistant Examiner—Devon Kramer
(74) Attorney, Agent, or Firm—Ralph D. Chabot

(57) ABSTRACT

The invention comprises a retarder system for use with road vehicles. The retarder system discloses an improved vehicular retarder which incorporates the use of a PMG Gear ratio which permits use of a permanent magnet generator on a secondary shaft that is coupled by the gear ratio to a drive train.

8 Claims, 17 Drawing Sheets

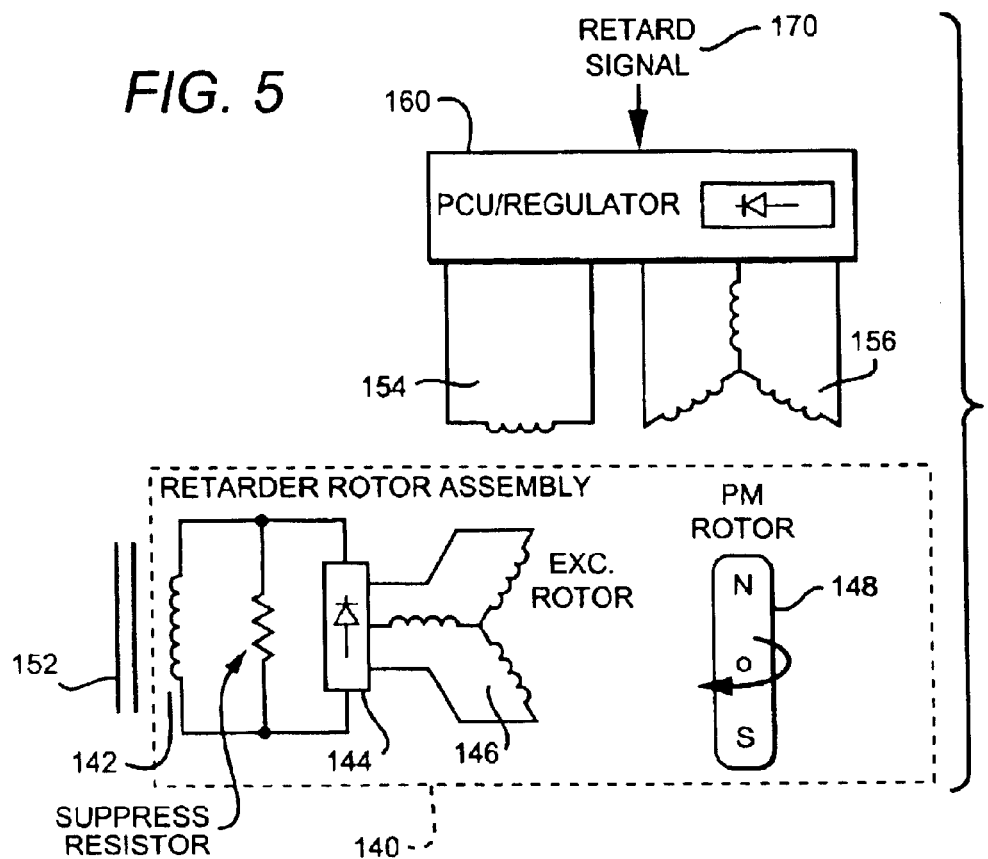
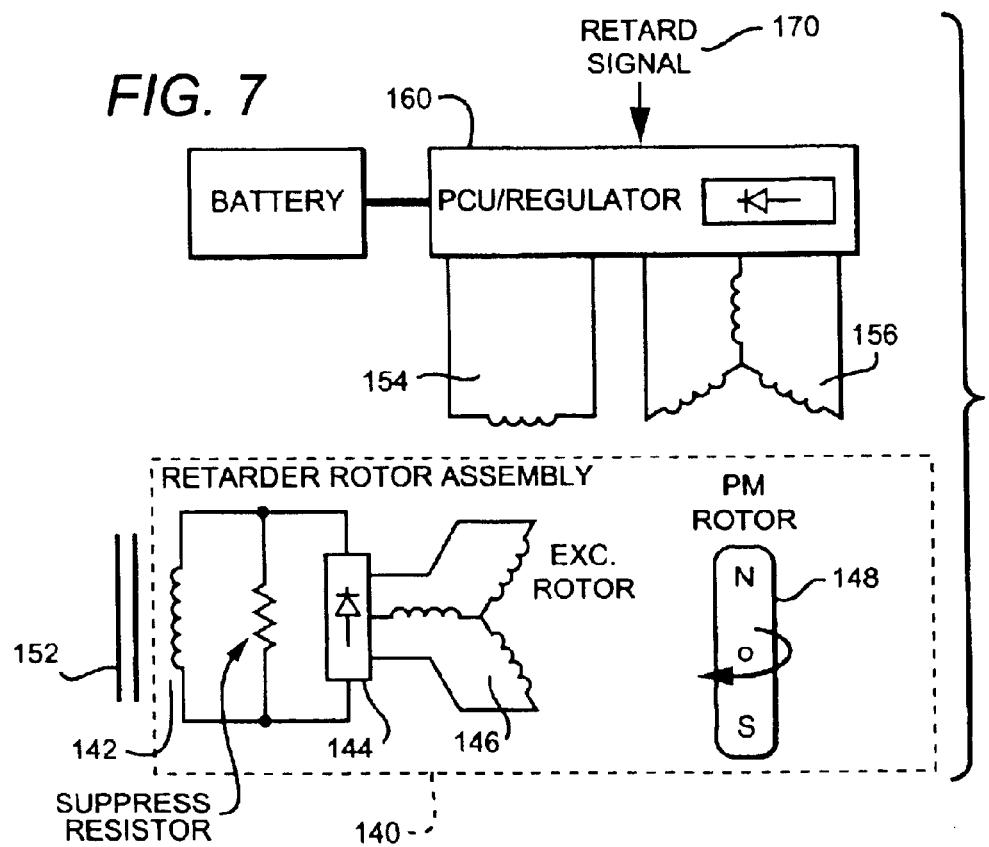

INTEGRATED RETARDER AND ACCESSORY DEVICE

This divisional application claims priority bearing Ser. No. 10/163,755 filed Jun. 6, 2002 now U.S. Pat. No. 6,578,681, which in turn claims CIP to U.S. Patent Application bearing Ser. No. 09/914,284 filed Aug. 23, 2001 now U.S. Pat. No. 6,543,588, which in turn claims the benefit of PCT application bearing Ser. No. PCT/US01/03030 filed Jan. 30, 2001 which in turn claims the benefit of U.S. Provisional Application bearing Ser. No. 60/179,900 filed Feb. 2, 2000. This application incorporates by reference the specification contained in Ser. No. 10/163,755.

TECHNICAL FIELD

The invention relates to an electrical system for road vehicles and the relationship between the vehicle's electrical system and drive-train for controlling torque, power generation, and engine start-up; specifically where a permanent magnet generator is coupled to a secondary shaft.

BACKGROUND ART

Commercial vehicles such as semi-trucks, garbage haulers, buses and the like, often incorporate a retarder as a way to reduce the vehicle's velocity without having to utilize friction brakes every time the vehicle is required to slow. Use of a retarder would therefore be a way to extend the useful life of a vehicle's brakes and avoid frequent and costly brake maintenance.

The power supply for these retarder devices can come from several sources. Some retarders operate by controlling the intake and exhaust valves of an engine; some by restricting engine exhaust; while other retarders are designed to utilize hydraulic power, magnetic or electromagnetic interaction. All retarders function to absorb or dissipate the kinetic energy associated with a moving vehicle.

In this specification, retardation is defined as the use of an electromagnetic retarder to slow a vehicle.

For electromagnetic retarders, two methods are known in the prior art for exciting its magnetic field:

One method uses the vehicle's battery and alternator, as a power source. As illustrated in. FIG. 2, retarder 30 competes with the rest of the vehicle loads for available power. During retardation, which occurs for example when traveling downhill, the engine is operating at a lower RPM. For this situation, the output of alternator 22 is insufficient to maintain the battery fully-charged. Also, retardation causes depletion of the battery charge.

The second method uses permanent magnets instead of a field winding. In this configuration, there is no demand placed upon the vehicle battery and alternator for retardation. However, the torque produced by retardation is limited primarily to either a full ON or full OFF condition. Alternatively, a costly rotor displacement can be incorporated, which would provide the ability to vary the retardation torque.

Besides electromagnetic retardation, it is well known in the prior art to employ hydraulic retardation as a means for assisting vehicular braking.

Disclosure of Invention

The invention is best described as an electromagnetic retarder system for use with motorized vehicles. Additional functions can comprise the retarder system, which can be adapted to include one or a combination of the following: 1) a brushless DC alternator; 2) a brushless DC starter; 3) a passive/active damper that replaces the vehicle's flywheel; 4) a transmission-synchronizing inertia brake; and, 5) a booster to offset the lag associated with using a turbocharger. A retarder system incorporating one or more of these functions can be collectively referred to as an Integrated Retarder And Accessory Device package (IRAAD). The IRAAD is explained below and has also been described in U.S. Pat. No. 6,543,588.

The purpose of this application is to introduce two improvements that may be incorporated as part of an IRAAD The first improvement is directed to a combination hydraulic-electromagnetic retarder and the second is directed to the use of a PMG in cooperation with a gear-box running off of the drive-train.

Original IRAAD Disclosure

The housing which contains the retarder system may be integrated with the engine or with the transmission. While the engine is operating, it produces torque on the drive shaft for powering the transmission. When required, the retarder produces retardation torque, or negative torque, to reduce the velocity of a vehicle.

The retarder system can be positioned either at the input or the output of the transmission. Positioning is determined by the desired application, as each location has its own advantages.

For example, a retarder system placed at the output of a transmission can be made small and lightweight by providing it with a high speed shaft. However, at this position, the retarder system could not be an effective starter or generator because it rotates only when the transmission is engaged by the clutch or other torque link.

Conversely, a retarder system located at the input of a transmission, while large, may take advantage of gear ratios obtained from downshifting, to produce an even greater torque. Also, when the retarder rotor assembly, which will be discussed in detail below, is positioned between the engine and transmission, its function as a generator is unimpaired, as rotation occurs as long as the engine is running. Finally, because the rotor assembly of the retarder system is coupled directly to the crankshaft, the device can be used as a starter. For these stated reasons, the retarder system is preferably positioned between engine and transmission. Also, for this configuration, it is preferred that the induction ring, sometimes referred to as the retarder drum, be adapted for a coolant to pass through so that it can be connected to the vehicle's existing cooling system (i.e. radiator) for dissipating the heat generated during retardation.

The invention comprises an electromagnetic retarder connected along the drive-shaft to an exciter generator. A permanent magnet generator (PMG) is drivingly coupled to the drive shaft. It can be located about the drive shaft but it is not directly connected to either the retarder or exciter generator in the physical sense although output from the PMG will be used for the exciter generator. At least one rectifier is positioned between and hard-wired to the field winding and exciter rotor. In the preferred embodiment, the field winding, the rectifier and the rotors of the exciter and PMG are collectively referred to as the retarder rotor assembly.

Positioned about the rotor assembly is a housing which can be integrated with either the engine or transmission housing, or as a separate housing. This housing preferably comprises the induction ring, and the stators of the exciter generator and PMG. Therefore, the retarder, exciter generator and PMG each have relatively rotatable elements, the stationary retarder induction ring and stators of the exciter generator and PMG, and their respective rotatable elements, the field winding and exciter rotor and PM rotor which rotate when the drive train is operable.

The exciter generator allows for brushless operation, while the PMG is referred to as "self-excited" because its rotor is coupled to the vehicle's drive-shaft and will produce current so long as the drive-shaft is rotating.

The electromagnetic retarder operates by energization of the rotating field winding of the rotor assembly to interact with a stationary induction ring to produce torque, which, together with drive-shaft rotation, generates power. Therefore, both of the retarder elements, the field winding and the induction ring are in surrounding relation to the main drive shaft.

It is important to note that, although torque may exist between the field winding of the rotor assembly and the induction ring even at a standstill due to magnetic attraction, for torque to be produced according to the invention, there must exist relative motion between the PMG rotor and stator. In other words, the field winding requires energization by an electric current which is created as a result of the output produced by the PMG.

This allows the PMG to convert mechanical power to the electrical energy required to energize the exciter generator and ultimately the field winding of the rotor assembly. Since the PMG will produce electricity whenever the drive-shaft is rotating, it is necessary to use a regulator to regulate the level of current reaching the exciter stator. Operation of the regulator would depend upon the type of external signal received. In addition, a power conditioning unit (PCU) is required to condition the alternating current (AC) produced by the PMG into direct current (DC).

The invention will operate equally as well if the induction ring is made to rotate, and the magnetic field is held stationary.

In addition to furnishing the electrical energy to power the exciter generator, the PMG can also be used for charging the vehicle's battery; thus eliminating the need for an alternator. Further, the power flow through the PCU is partially reversible so that the battery can be used to motorize the PMG; thus eliminating the need for a starter.

Also, the inertia produced by the rotor assembly can effectively replace the engine flywheel. Controlled pulsing of the retarder in opposition to engine positive torque pulsations can achieve active torque damping. It is also possible to use the PMG as a motor and controllably pulse it in opposition to the engine's negative torque pulsations to achieve a similar result, but with a higher net positive torque resulting.

Finally, it becomes possible to use the PMG as a motor to provide positive torque to the drive train, when a power boost is required. This power boost would be beneficial to compensate for the lag commonly encountered with a turbocharged system. The duration and amplitude of the boost would be limited by the capacity and state of charge of the battery. Because the PMG functions as a motor in some conditions and as a generator in other instances, the PMG can be referred to as a motor/generator.

Although the invention uses standard electromagnetic principles, i.e. a field interacting with an armature, it further provides the advantage of self-excitation, while retaining the controllability associated with field windings. This is accomplished by using an exciter generator in combination with a PMG on the same shaft and preferably within the same housing.

The invention has thus far taught an electromagnetic retarder by itself and in combination with one or more of four other functions. However, the principles discussed herein can also be applied without using a retarder in combination.

For example, a PMG configured with its rotor coupled to the drive-shaft and its stator thereabout can generate sufficient current to serve as an alternative to an alternator. Also, the vehicle starter can be replaced by utilizing the PMG as a brushless starter when an angular rotary position indicator is provided and an inverter is used to direct current from the vehicle's battery.

Additional configurations can be obtained by combining the different functions mentioned above.

The invention provides the following advantages over the prior art:

The retarder system is self-excited in that it requires no energy from the vehicle's battery or alternator. The battery therefore, will not be drained during the retardation cycle. The electrical power required to excite the retarder is generated by a PMG which converts mechanical energy from the rotating drive-shaft, into usable electricity.

The retarder system can be adapted so that the PMG is utilized to furnish electricity to charge the vehicle's battery as well as providing electricity for the retarder's operation; thus eliminating the need for an alternator.

The retarder system can also be adapted so that the battery can supply power to the PMG in a "starting mode" via a start inverter; thus eliminating the need for a starter. Also, with the engine running, the PMG can be made to compensate for turbocharging "lag" by boosting the system with motive power.

The retarder system can also be adapted for use as an active/passive damper. The inertia developed by the rotor acts as a passive damper which can replace the flywheel. The retarder system can also employ active damping. The advantage of active damping is that mechanical stresses can be reduced, and thereby extend the life of the transmission, differential, and other drive train components.

The retarder system can also be adapted to replace the inertia brake commonly used in transmissions to aid in synchronizing gears while downshifting. The inertia brake is often expensive and requires the addition to the transmission of an extra power take off (PTO), consisting of at least a pair of gears.

Improved fuel efficiency will result from a reduction in overall vehicular weight. The prior art starter, which is a parasitic load as soon as the engine is started, is eliminated. The energy which would have been wasted as a parasitic load, is now available for other load purposes.

The retarder system results in improved reliability because: a) the number of component parts is reduced, b) the life of the transmission and other drive line components is extended because of a smoothing out of torque pulsations by the active damper, and, c) battery life can be extended because controlled starts minimize current surges encountered with normal, brush-type starters. Power management reduces the magnitude of power drain and extends the life of the battery.

First Improvement—Combination Hydraulic-Electromagnetic Retarder

For my purposes, I define hydraulic fluid as any fluid with the right combination of lubricity, viscosity, specific heat, specific gravity, electrical resistivity, high and low temperature characteristics, etc. that allows it to accomplish its intended use. This may end up being a light oil such as brake fluid, synthetic such as turbine oil, or heavier grades such as transmission fluid or engine oil. In any case, selection would be governed by the application.

As earlier described in my specification, the mass of the retarder electromagnetic field replaces the mass of the engine flywheel, thus becoming a "passive" damper.

However, when the requirements for retardation torque are high, the rotor must be enlarged. The torque requirements may sometimes result in a rotor design exhibiting inertia that exceeds that of the original flywheel. Such a rotor design would detract from vehicle performance during acceleration. This is mathematically represented by the formula:

$$T = I\alpha$$

Where: T is Torque
I is Inertia
α is Angular acceleration.

In short, a large electromagnetic retarder can have a detrimental effect on vehicle acceleration and fuel efficiency. However, it is possible to design a retarder in accordance with my invention to obviate this negative effect. The design change would essentially modify the magnetic retarder into a hydraulic-electromagnetic retarder hybrid.

This modification consists of designing an electromagnetic retarder with a rotor mass and diameter that result in an inertia which is close to that of the original flywheel. The balance of the retardation torque required by the vehicle is obtained by allowing the rotor of the electromagnetic retarder to thrash through hydraulic fluid. The saliency of the rotor poles would thus emulate a hydraulic turbine and contribute substantially to the overall torque. This is accomplished by pumping under pressure a liquid such as hydraulic fluid into the retarder cavity at the time retardation is required.

Preferably, the retarder would be designed so that when the retarder cavity is empty, it matches the designed inertia of the flywheel it replaces. The torque furnished by the electromagnetic section would thus be sufficient for the driver's purposes under most circumstances. Should additional retardation or faster deceleration be required, the electromagnetic torque can be supplemented by selectively closing the coolant drain passage and allowing it to fill the cavity surrounding the salient pole rotor. By proportionally varying the hydraulic fluid pressure, any rate of deceleration may be maintained.

Hydraulic flow into and out of the cavity is accomplished by a fluid circuit having an inline pump which can be operated either by operable connection to the drivetrain or powered by an electronic source. A control valve such as a solenoid valve is operably coupled to the fluid circuit and controls the flow of hydraulic fluid out of the cavity. The control valve is electronically connected to control unit which is also controls the electromagnetic retardation. This electronic circuit means determines the additional necessary torque to be provided hydraulically, what the desired level of hydraulic fluid within the cavity should be and controls the control valve accordingly.

Again, when retardation is demanded, the cavity of the hydraulic-electromagnetic retarder is filled under pressure with fluid to supplement the electromagnetic retardation without affecting inertia. The purpose is to minimize inertia imposed on the engine, and enhance acceleration and efficiency.

An advantage of my hydraulic-electromagnetic retarder hybrid is the combining of two different methods of retardation into one design to enhance performance over what could be achieved from either a hydraulic retarder or electromagnetic retarder of the same size.

Another advantage is that since hydraulic fluid is more efficient as a heat transfer medium than air, it can be used as a heat sink for the electromagnetic losses; and thereby transfer heat produced in the rotor as a result of friction and magnetic excitation more efficiently than standard electromagnetic retarders to the induction drum.

Improvement—PMG Gear Ratio

Since the power that a PMG produces is directly proportional to the rotational speed of the rotor relative to the stator, it is possible, rather than having the PMG directly connected to the drive-train, to have it operate on another shaft operatively connected to the drive-train by the use of a gear train.

For example, using a gear ratio of 4:1, a PMG of a certain size, coupled to the gear train is capable of generating 4 times the power than if it were directly coupled to the drive-train. It is then possible to use a smaller sized PMG when used with the appropriate gear train.

One advantage is that a smaller PMG is necessary to obtain the same output as a PMG located on the drive train.

Another advantage is that the PMG can be located in a separate housing separate from the retarder housing; or, it can be included within the same housing. Vehicular design or spacing considerations may prefer the PMG and gear box be located separate from the retarder housing. Because of the PMG location flexibility, the size of the retarder housing can be adapted to the application.

Still another advantage is that with the position of the PMG located away from the retarder housing, it is possible for the PMG to be replaced with a larger or smaller unit to suit the needs of the user.

BRIEF DESCRIPTION OF DRAWINGS

The details of the invention will be described in connection with the accompanying drawings.

FIG. 3a illustrates an alternative configuration for the position of the retarder relative to the transmission.

FIG. 5 is a schematic diagram of the self-excited retarder shown in FIG. 4, illustrating embodiment #1.

FIG. 7 is a schematic diagram of the self-excited retarder shown in FIG. 6, illustrating embodiment #2.

BEST MODE FOR CARRYING OUT THE INVENTION

This section is broken into two parts. The first pertains to the original disclosure found in Ser. No. 09/914,284. The second part addresses the two improvements to the originally disclosed IRAAD. contained un Ser. No. 10/163,755 and to which this divisional application applies.

Original IRAAD Disclosure

Figure 1:
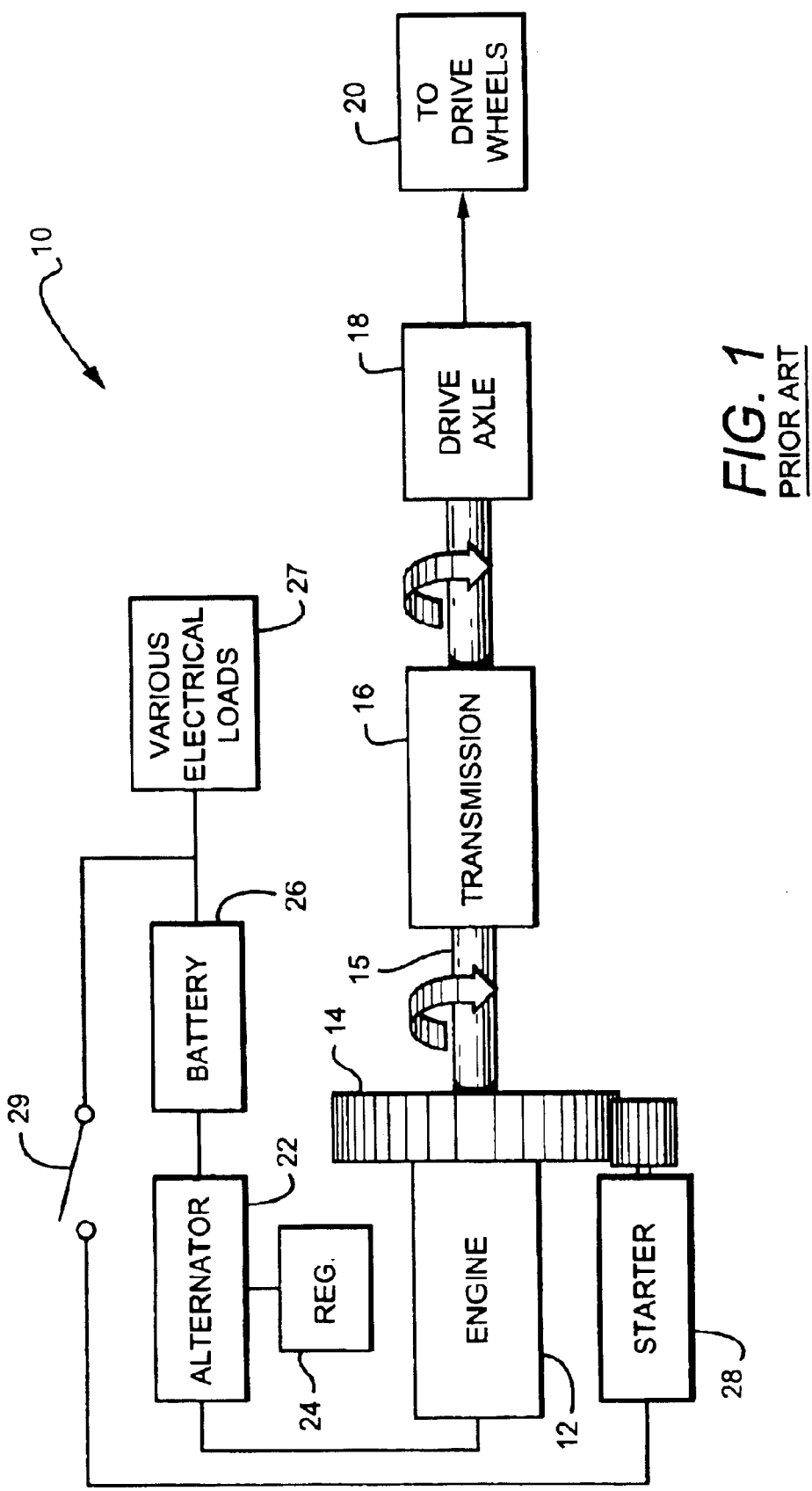
FIG. 1 is a block diagram of a typical drive train common in the prior art.
Figure 2:
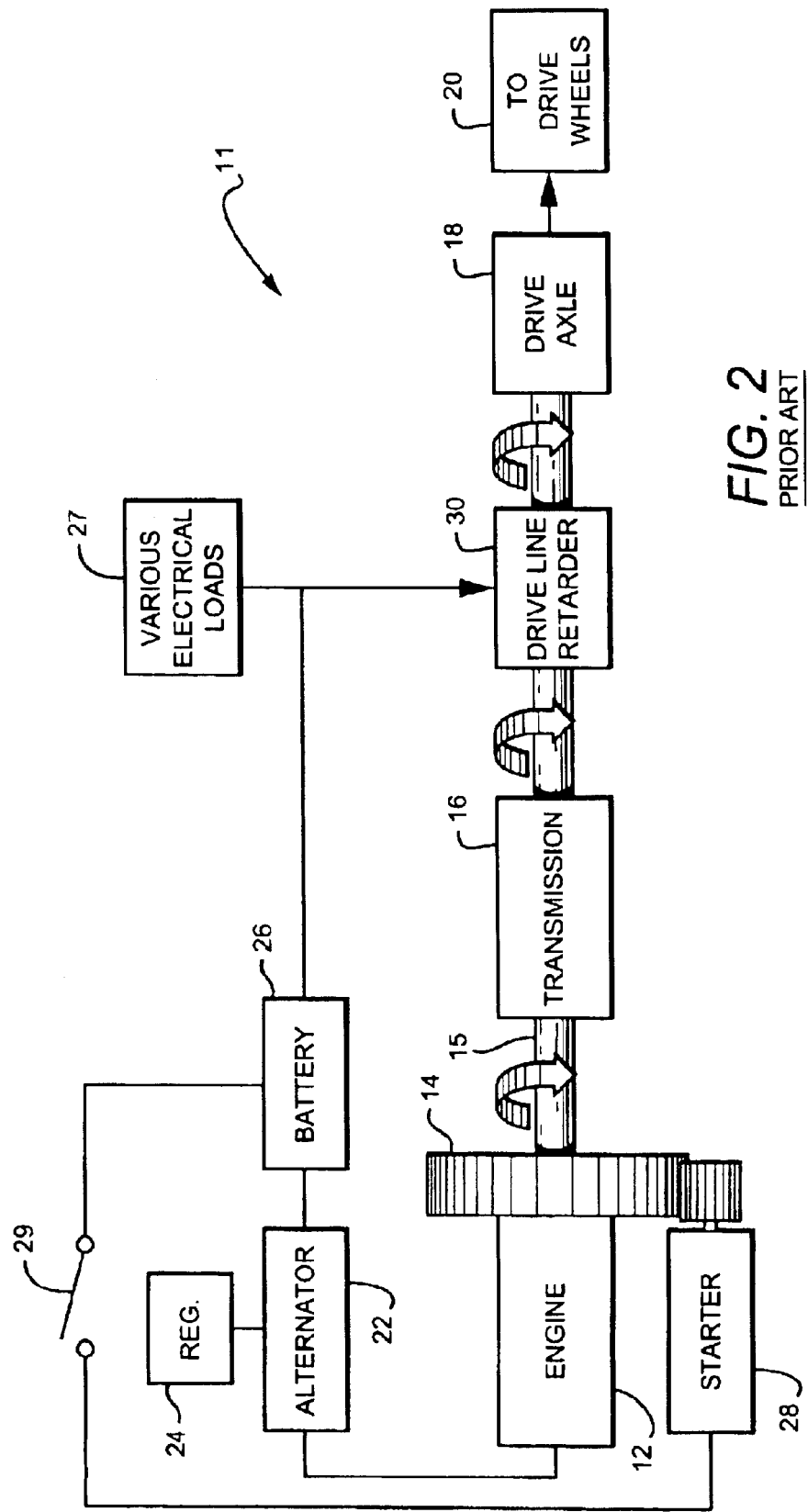
FIG. 2 is a block diagram of typical drive train utilizing an electromagnetic driveline retarder which is common in the prior art.

Two examples of prior art embodiments are presented in FIG. 1 and FIG. 2. FIG. 1 illustrates a normal drive train 10 without a retarder and how an engine 12, whose torsional oscillations are smoothed by a flywheel 14, uses a drive shaft 15 to drive transmission 16, drive axle 18 and drive wheels 20. In the FIG. 1 configuration, the vehicle relies on friction brakes for slowing and can, to some extent, use a lower transmission gear to assist in slowing.

Engine 12 also provides mechanical energy to alternator 22 whose output, stabilized by regulator 24, charges the vehicle's battery 26 in parallel with the various electrical loads 27 of the vehicle. A dedicated engine starter 28 is also connected mechanically to flywheel 14 and electrically to battery 26 by means of a switch 29.

FIG. 2 illustrates a prior art drive train 11 incorporating an air cooled, single stage electromagnetic retarder 30 in series with drive-shaft 15. In this configuration, a heavy demand can be placed upon the electrical system during retardation, often grossly exceeding the output capacity of alternator 22. When retardation is most needed, as, for example, traveling downhill, engine 12 is idling and the electrical output of alternator 22 is not at maximum. This situation has the potential for depleting battery 26, especially if retardation occurs for a long period of time as when traveling down a long downhill gradient.

The power control unit(s) of this invention will be utilized to function in different capacities in the following embodiments and will be part of one or more of the circuit means described in the claims. It is to be understood that a power control unit may function only as a regulator and rectifier as in the following embodiment #1, or it may also include, for example, the bi-directional ability of an inverter in embodiment #3.

The following are descriptions of four embodiments of the invention.

A. Embodiment #1 Electromagnetic Retarder

Figure 3:
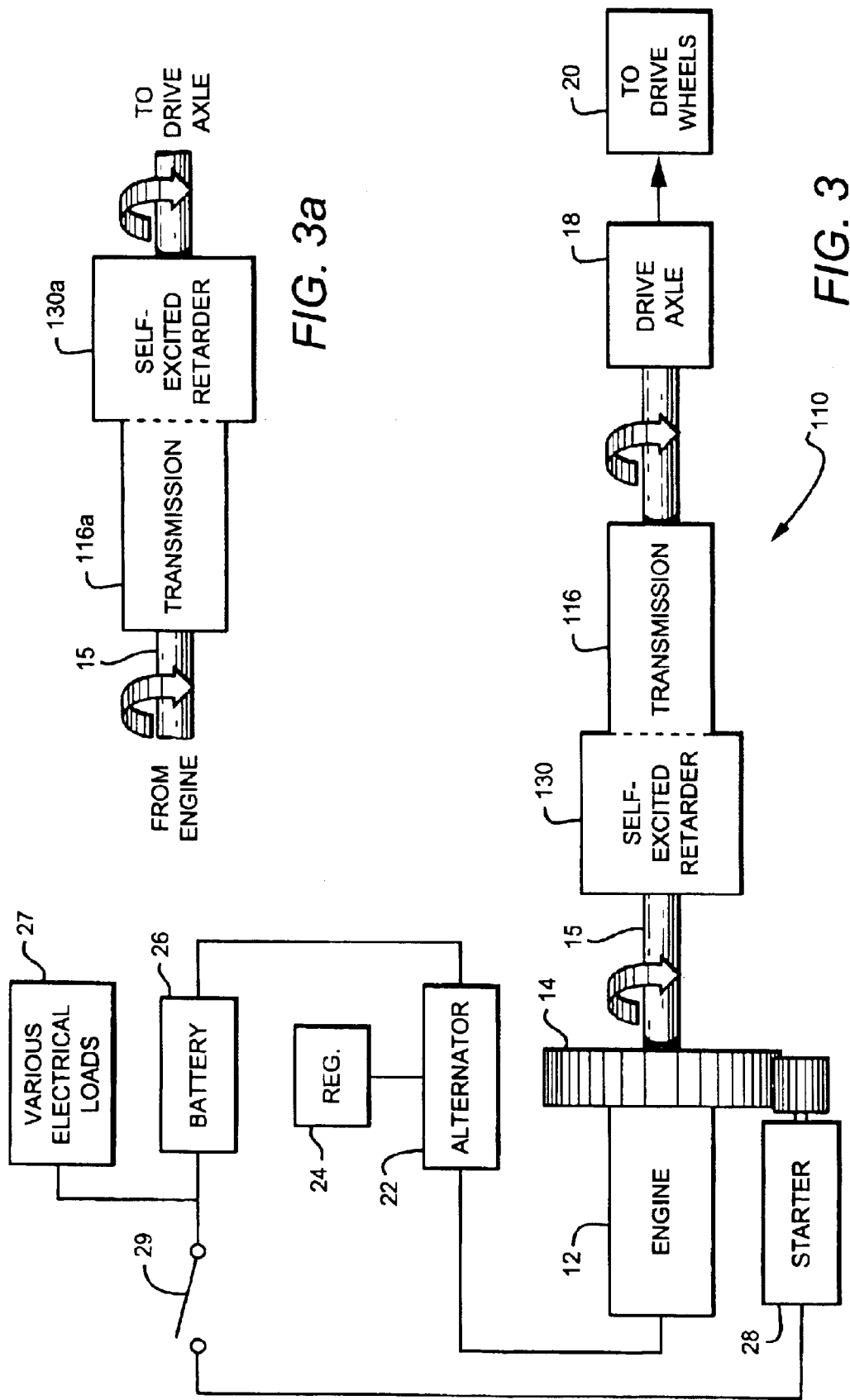
FIG. 3 is a block diagram of a first embodiment of the invention wherein the drive train is incorporated with a self-excited electromagnetic retarder, integrated with the transmission.
Figure 4:
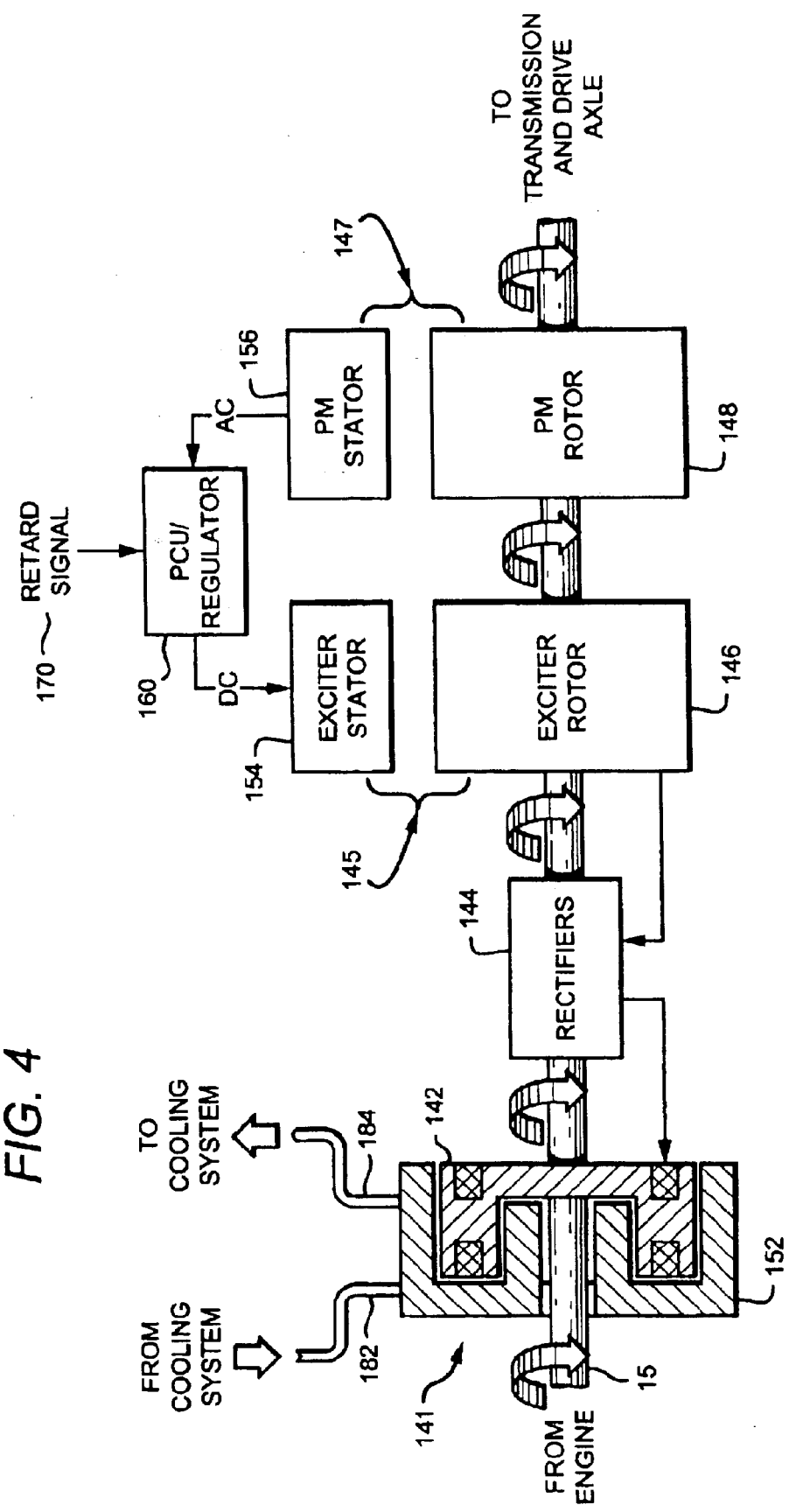
FIG. 4 is a block diagram of the self-excited retarder shown in FIG. 3, illustrating embodiment #1.
Figure 8:
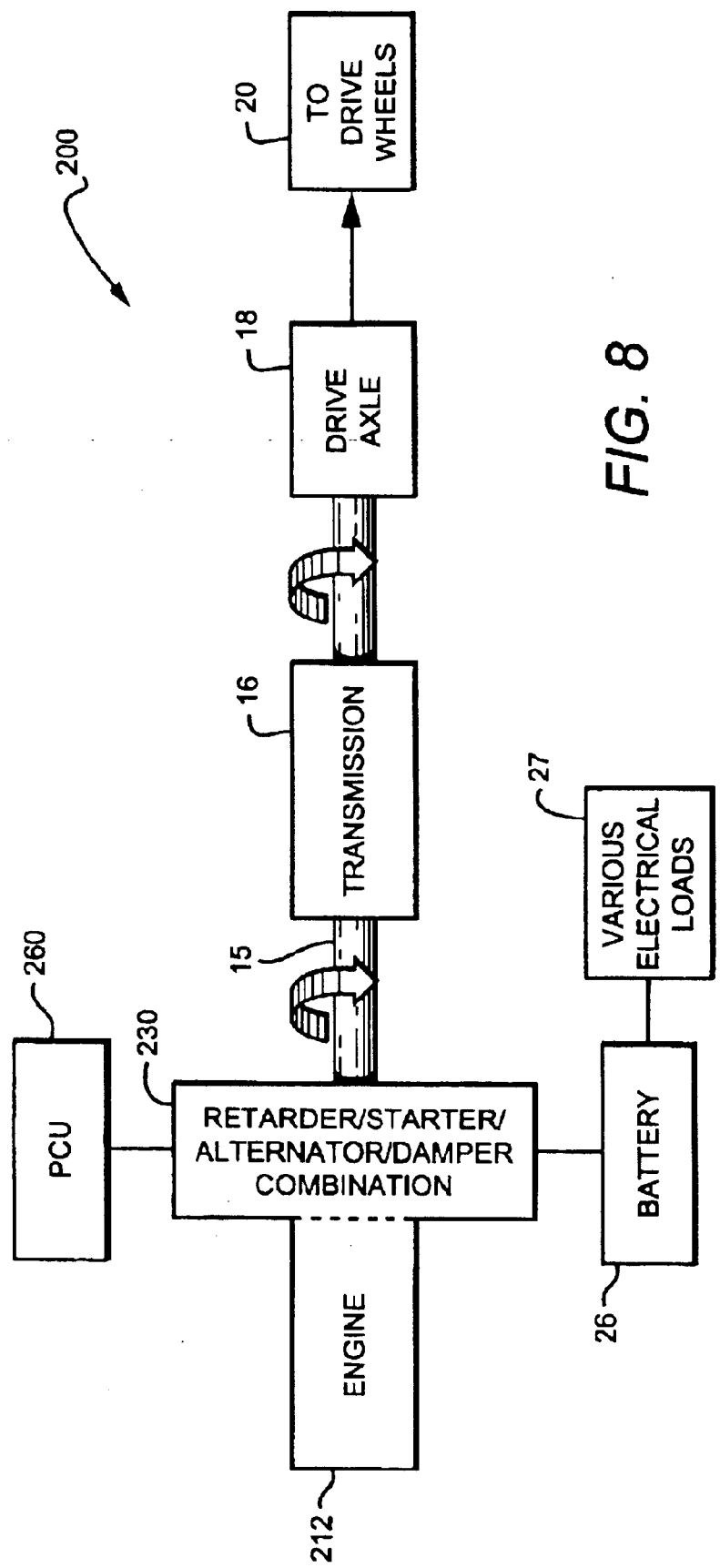
FIG. 8 illustrates an alternative configuration for the position of the retarder relative to the engine and further incorporating embodiment #3 of the retarder system.

The present invention 110, in contrast to the prior art, integrates a retarder 130 or 130a with the transmission placing it either at its input, or at its output, as shown in FIG. 3 or FIG. 3a respectively. Alternatively, the retarder may be integrated with engine 212 as illustrated in FIG. 8. FIG. 4 and 5 illustrate how the internal and external device components are arranged and connected. FIG. 5 shows a rotor assembly 140 comprising a field winding 142, rectifiers 144, exciter rotor 146 and PM rotor 148, interacting magnetically with a retarder stator assembly comprising a liquid-cooled, dual induction drum 152, an exciter stator 154, and a PM stator 156. In this embodiment, the retarder stator assembly is part of a housing which can be integral with the housing of the engine, transmission, or as a separate housing itself.

Thus, relative motion is created between the rotors and stators of PMG 147 and exciter generator 145, whenever the engine is running, when the retarder rotor assembly 140 is positioned at the transmission input, or integrated within the engine flywheel housing.

PCU 160 is a regulator which accepts three-phase AC power from PMG 147, conditions it and regulates current flow to exciter stator 154 as pulse-width modulated (PWM) DC, according to an external stimulus retard signal 170.

The following are features of the self-excited electromagnetic retarder:

1. Induction ring 152 is stationary and is designed with input 182 and output 184 flow paths which can be connected to the engine's liquid cooling system (not shown). The coolant is shared with engine 12 and can either be in series with the engine or in parallel configuration. The coolant present in the cooling system should be capable of handling the heat to be dissipated from retarder induction ring 152. When retardation is required in response to an external retard signal 170, the engine load is typically minimal and its cooling requirements are drastically reduced. Therefore, a vehicle's cooling system does not have to be enlarged to handle the heat to be dissipated from a retarder, as envisioned by the invention. Induction ring 152 can be configured as a dual cylindrical drum as shown in FIG. 4, excited by the same wound magnetic field 142, to take advantage of otherwise wasted inner space. When designed for heat dissipation by the vehicle's cooling system rather than air-cooled, the size and weight of induction element 152 can be minimized.

2. All three hard-wired components, namely the field winding 142, rectifiers 144 and exciter rotor 146 are on drive-shaft 15, and therefore rotate at the same speed. Typically, PM rotor 148 is also attached about drive-shaft 15, but because it is not hard wired to the other rotor assembly components, it could be located elsewhere, for example, if another shaft was more desirable because of a specific design criteria.

3. PMG 147 is sized to take advantage of the rotational speed of drive-shaft 15 and provide all the excitation power required by exciter generator 145.

4. PCU/Regulator 160 is a solid-state device that receives AC power from PM stator 156, rectifies it to DC, then feeds the DC to exciter stator 154 according to the retardation requirements of the vehicle. The preferred method of regulating the DC is PWM, although linear regulators can also be made to work in a satisfactory manner. PCU/Regulator 160 may be integrated within the retarder housing, or may be mounted remotely, depending on the application and design preferences.

5. PCU/Regulator 160 determines the retardation requirements of the vehicle based upon external signals received 170. These requirements may be determined by a variety of signals, such as gas pedal position, brake pedal position versus speed, or other parameters, such as reactionary torsional stresses that may be important in the onset characteristics of retardation torque. Also, the particular signal system for the vehicle may be designed so that PCU/

Regulator 160 only operates when a signal is received, or it may operate in a manner by which it constantly receives a signal but adjusts its function according to changes in the signal received.

6. The retardation torque applied is fully controllable and can be tailored to minimize stresses on the drive train, while achieving the most efficient retardation profile. The particular retardation signal 170 received correlates to a specific proportion of usable current produced by the PMG. In this way, the amount of PMG current used by the exciter field may be varied from 0 to 100%.

This embodiment can replace the inertia brake commonly used in transmissions to aid in synchronizing gears while downshifting. An input signal (not shown), similar to retard control signal 170, can be used to jog the transmission gears and assist in shifting.

For the electromagnetic retarder system just described, PMG 147 is used for exciting the retarder without current being drawn from the vehicle's battery or alternator. However, with minor modification, the electromagnetic retarder system just described can be adapted to perform other vehicular functions as will now be described.

B. Embodiment #2 Electromagnetic Retarder/Alternator Combination

Figure 6:
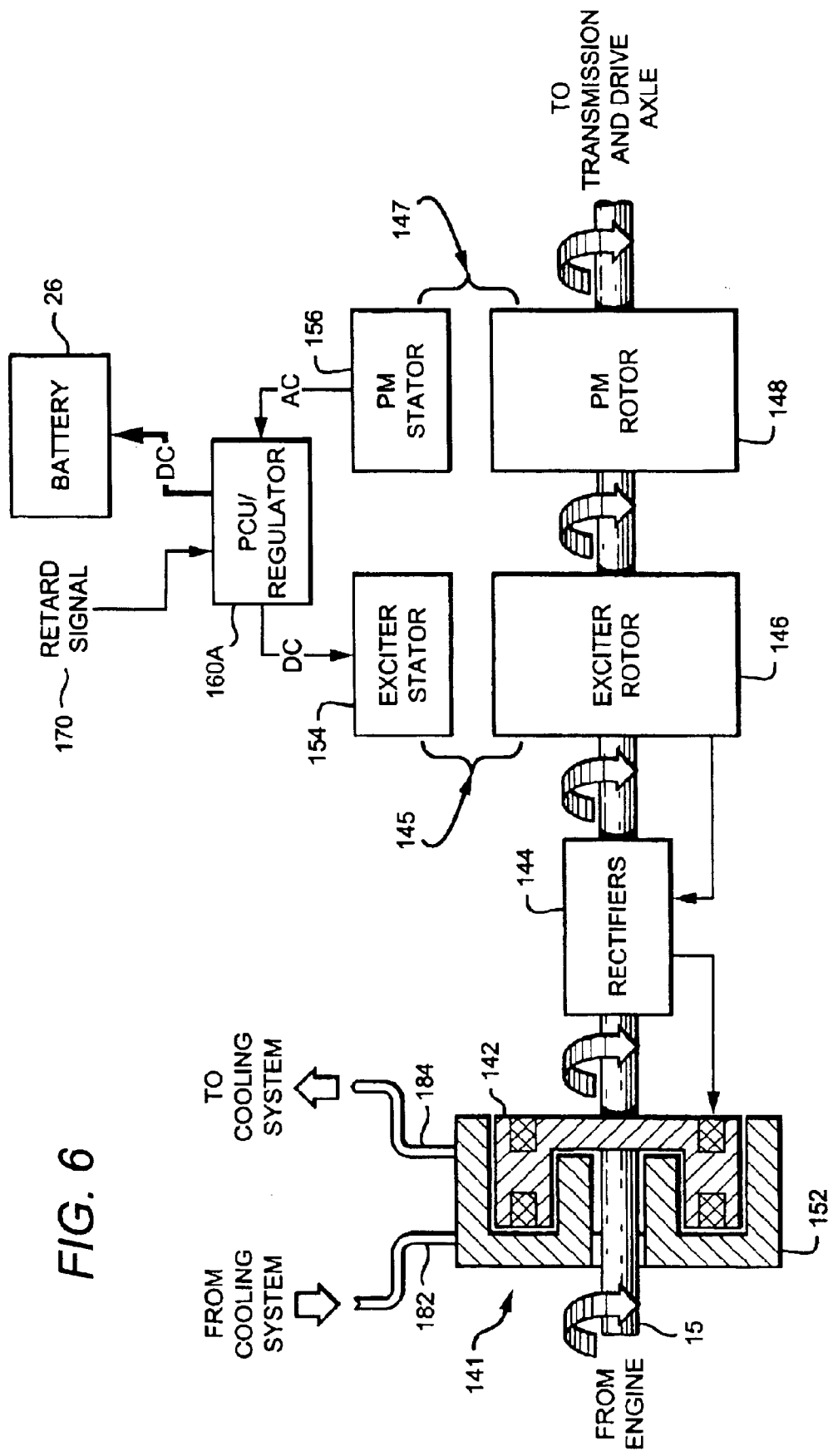
FIG. 6 is a block diagram of an alternative retarder system illustrating embodiment #2.

This combination is best illustrated by FIG. 6 and FIG. 7. Whenever the engine is running, a scaled-up PMG can be utilized as a functional replacement for the alternator, which is typically belt-driven by the same engine.

PMG 147 can be connected to battery 26 via PCU/Regulator 160a for charging; thus eliminating the need for an alternator. However, PMG 147 may not be large enough to furnish a charge to battery 26 while its output is required for retardation. Accordingly, PMG 147 can be designed with sufficient excess capacity to charge battery 26 while it is providing the necessary current for producing the desired retardation torque. This may be described as a form of regenerative braking.

PCU/Regulator 160a serves two functions.

The first is to provide a constant voltage supply to charge battery 26 and provide power for the other electrical loads of the vehicle such as headlights, fuel pumps, etc. These are typically 13.5 volts for a 12 volt system, though it can easily be adapted to a variety of levels also used in the transportation industry, such as 24 volt and the newly developing 42 volt systems. The traditional use of an alternator is not required and is not a part of this embodiment.

The second function of PCU/Regulator 160a is a variable output voltage supply, such as obtained from pulse-width modulation (PWM) that induces a current and feeds it to exciter stator 154 for creating a field with rotor 146 upon receiving an appropriate signal from retard controller 170. The particular signal received correlates to a specific proportion of usable current produced by the PMG. In this way, the amount of PMG current used by the exciter field may be varied from 0 to 100%.

PCU/Regulator 160a performs a dual output function while PCU/Regulator 160 of embodiment #1 simply varies the output voltage supply to exciter stator 154.

This embodiment can integrate the retarder housing with transmission 116, placing it either at its input or output but preferably at its input. The retarder housing contains PMG 147, exciter generator 145, PCU/Regulator 160a, rectifiers 144, field winding 142, and a liquid cooled, stationary dual induction ring 152. This is the preferred embodiment so that all equipment is housed in a single unit attached to transmission 116 and about drive shaft 15.

Nonetheless, it is not necessary that all components be present in the same housing, or that the housing be attached to the transmission. This embodiment could also function if it is integrated within the flywheel housing of the engine.

Also, for purposes of this invention, many different configurations can be designed that could house some or all of the components described. The invention can be practiced whether or not all components are present in a single housing. All that is necessary is that the described components be physically located on the vehicle and operatively connected to function as described herein.

C. Embodiment #3 Electromagnetic Retarder/Starter Combination

Figure 9:
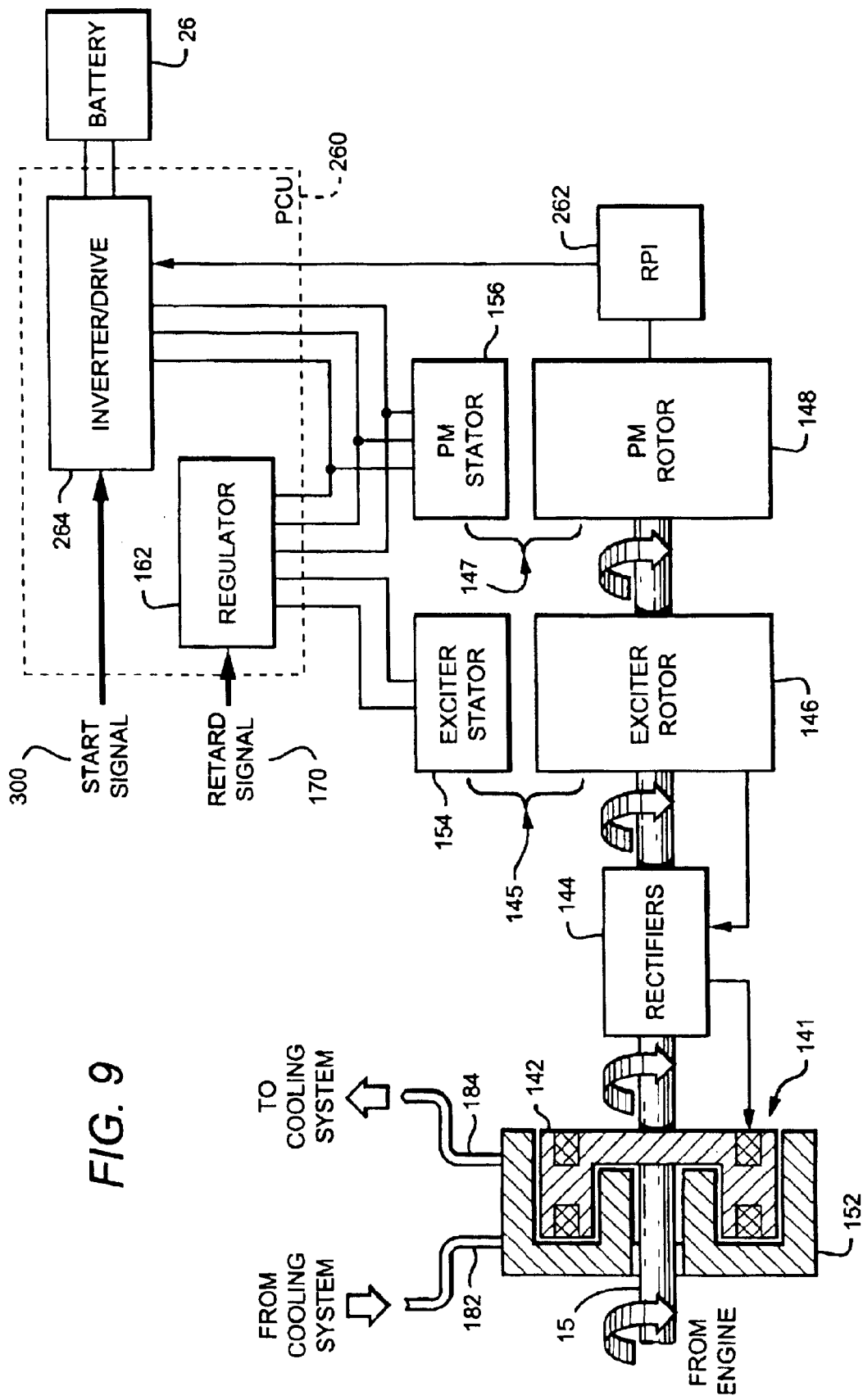
FIG. 9 is a block diagram of an alternative retarder system illustrating a retarder, starter, and alternator combination as embodiment #3.
Figure 10:
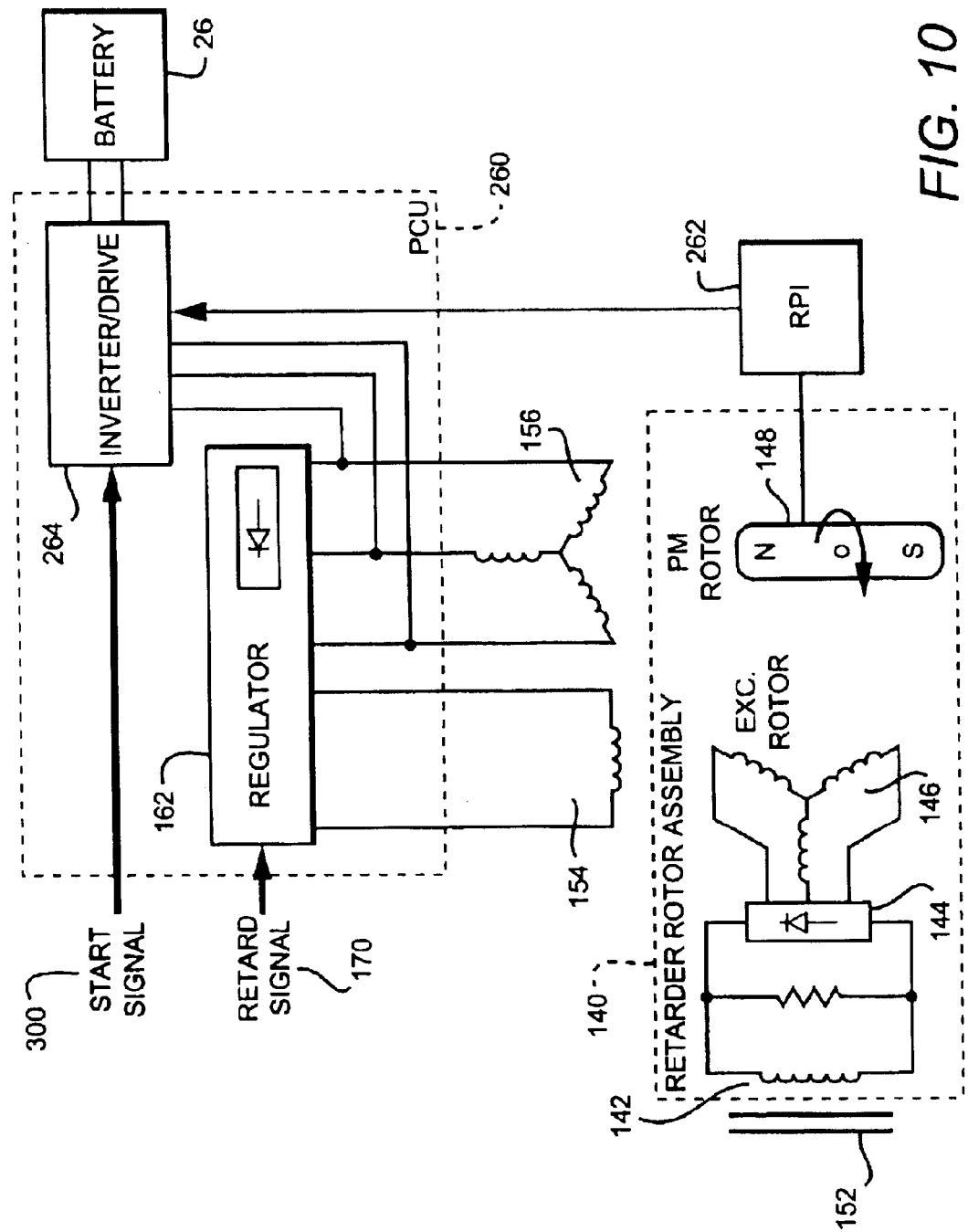
FIG. 10 is a schematic diagram of the retarder, starter, and alternator combination shown in FIG. 9, illustrating embodiment #3.

FIG. 8 illustrates that the retarder can be integrated with engine 212. FIG. 9 and FIG. 10 best illustrate embodiment #3 which utilizes the system to function both as a retarder and as a starter. The circuitry of PCU 260 comprises a regulator 162 and an inverter/drive 264 having an input stage of controllable semi-conducting switches, such as silicon-controlled rectifiers (SCR's), or field effect transistors (FET's). These devices are normally arranged in a three-phase configuration to rectify and regulate the output voltage of PMG 147. These same devices can also be used to switch a flat DC level, such as obtained from a battery, to AC.

Thus, it becomes possible to reverse current through PCU 260; specifically from battery 26 to PMG 147 and utilize it as an inverter. The bidirectional ability of inverter 264 allows for a duality of purpose and it now becomes possible to use PMG 147 as a brushless starter motor for starting engine 12.

A traditional stand-alone starter operates by engaging the toothed outer diameter of the flywheel with its own pinion gear, providing the means to crank or start the engine.

The design eliminates the need for a separate stand-alone starter. This not only results in acquisition cost savings, but does away with a component that is used infrequently; most of the time occupying a parasitic role and reducing overall vehicle power efficiency.

A rotary position indicator (RPI) 262 is provided and represents a suitable means, such as a resolver, inductive or magnetic pickup, or an optically encoded device which can identify the angular position of PM rotor 148 and provide this information as a signal to PCU 260, and specifically to inverter 264. These devices are commonly available and can be easily adapted to the device. RPI 262 can be both static or dynamic. RPI 262 indicates a particular static position of the drive shaft when the engine is to be started.

This enables PMG 147 to start the engine smartly, with minimum inrush current, which helps to prolong battery life.

D. Embodiment #4 Electromagnetic Retarder/Starter Damping Combination

Figure 11:
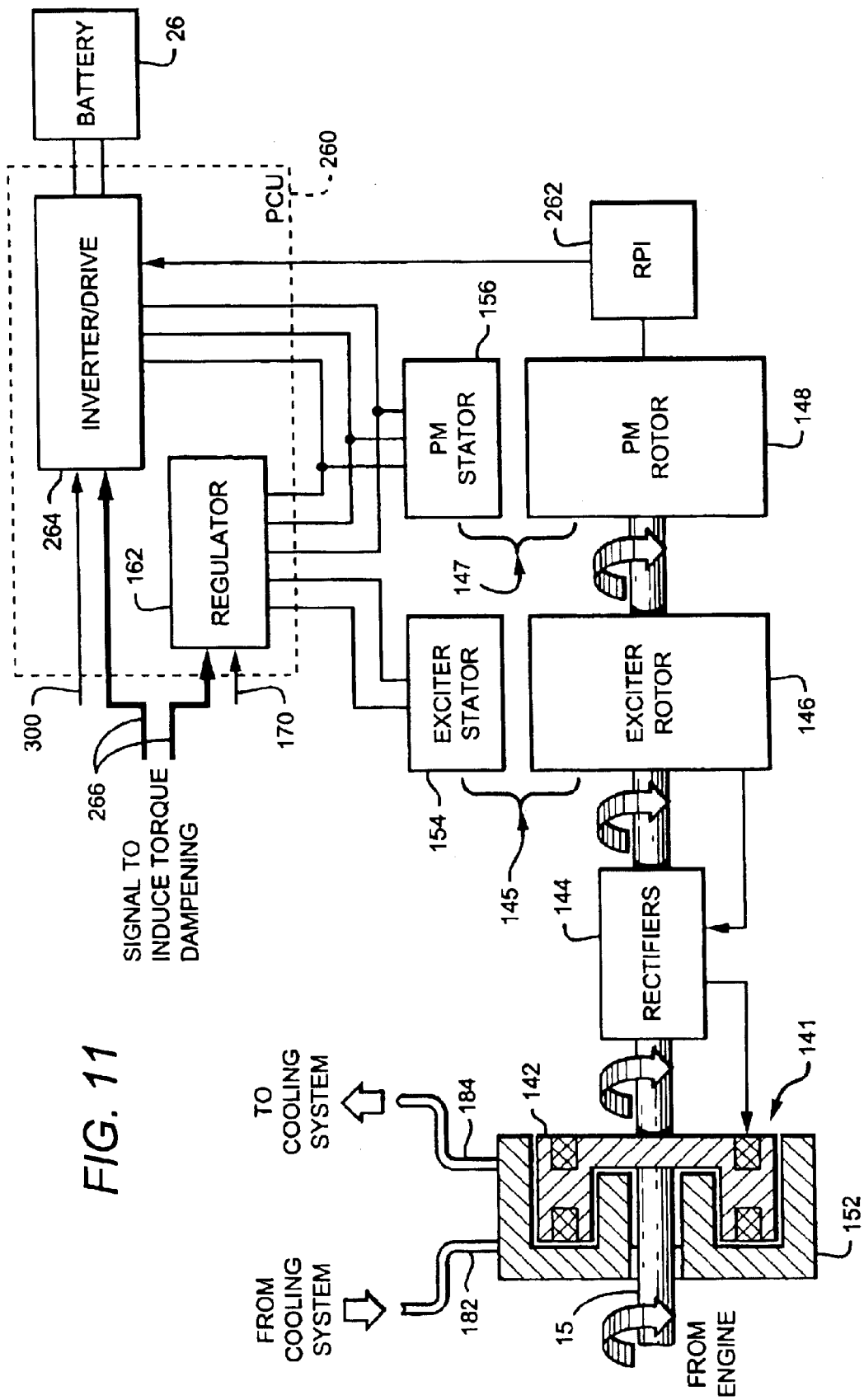
FIG. 11 is a block diagram of an alternative retarder system illustrating a retarder, starter, alternator and damper combination as embodiment #4.
Figure 12:
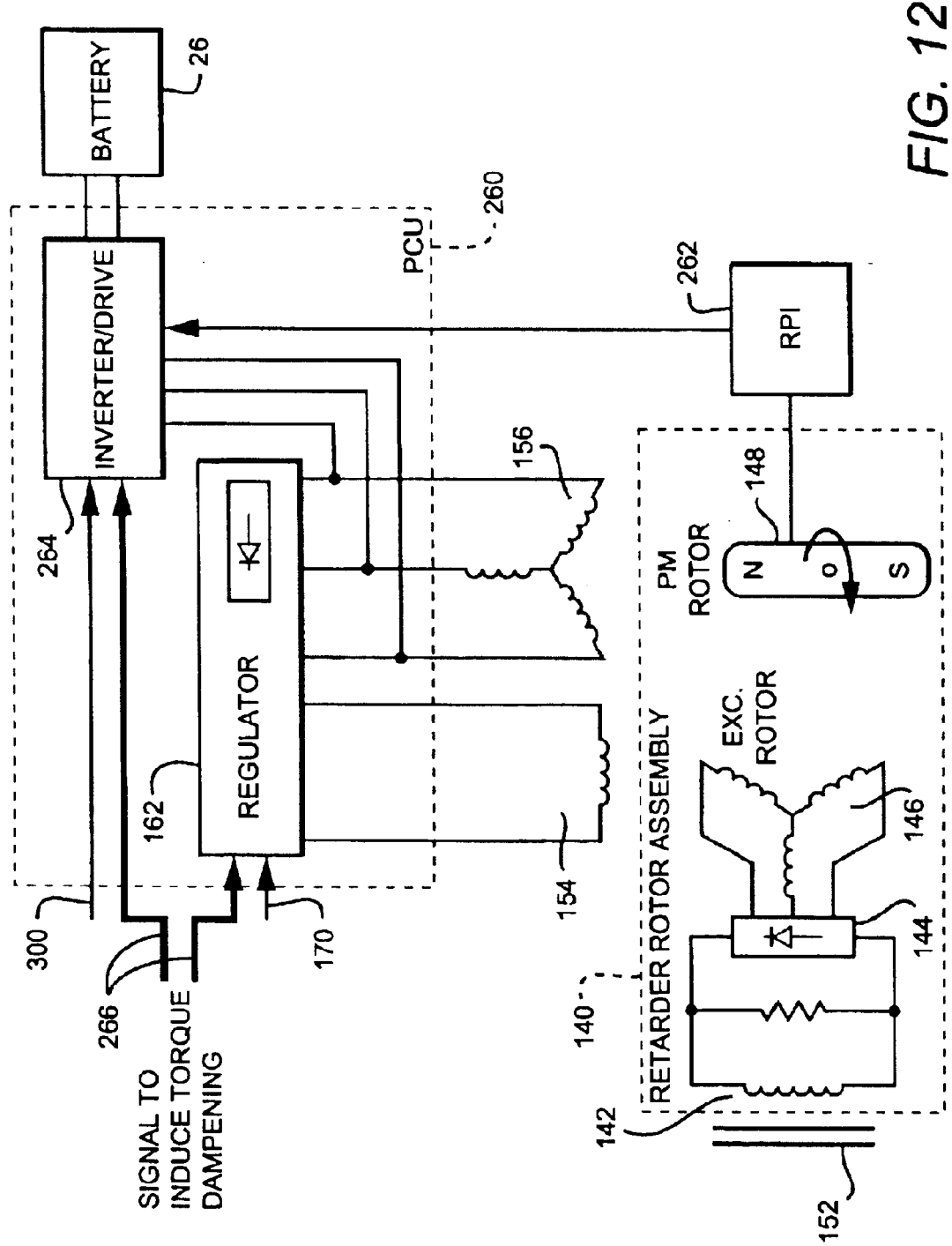
FIG. 12 is a schematic diagram of the retarder, starter, alternator and damper combination shown in FIG. 11, illustrating embodiment #4.

FIG. 11 and FIG. 12 best illustrate embodiment #4 which utilizes the system described in embodiment #3 to also include a torque dampening function. The electromagnetic retarder system can be modified to provide a damping effect; thus eliminating the need for a flywheel 14 as shown in prior art FIG. 1. The retarder system would be used as an active damper to reduce torque pulsations encountered in internal combustion engines, particularly diesel engines, thereby extending the life of the transmission, differential and other drive train components.

Typically, the prior art utilizes a flywheel which is mechanically connected to the end of the crankshaft. The flywheel serves as a passive damper, by imposing its own inertia upon the system. Inertia resists changes in speed that tend to be induced by the engine's torque pulsations and oscillations.

The damping function provided by the flywheel can be replaced by rotor assembly 140 since inertia can be made to approximate the damping effect of a flywheel.

The active damper would function as follows: net torque at the engine would be monitored by a strain gauge, torque transducer or the like. Real-time measurements 266 could be transmitted to regulator 162 or to inverter 264. If regulator 162 receives signal 266, then the off-setting torque would be ultimately delivered to the system by retarder 141 in the same way as retardation torque would delivered as described in embodiment #1. Regulator 162 would vary the level of current provided to exciter generator 145, in response to real-time torque measurements 266 to produce an opposite pulse to minimize the oscillations. This effect is illustrated as wave-line a in FIG. 15.

Alternatively, if inverter 264 receives signal 266, then the offsetting torque would be delivered to the system by PMG 147 in the same fashion as PMG 147 would be used to start engine 212.

Figure 15:
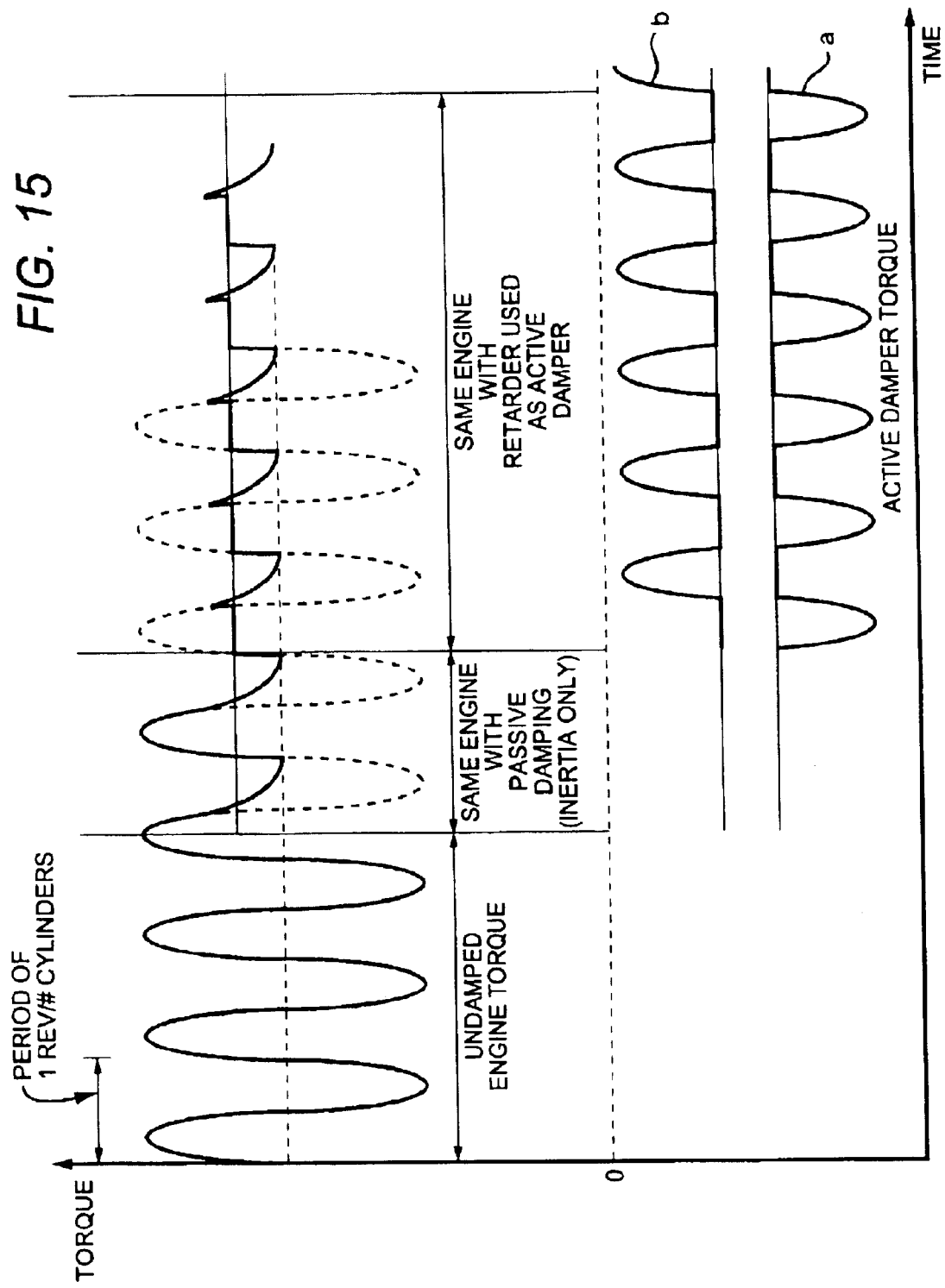
FIG. 15 illustrates torque characteristics of a typical diesel engine with passive and passive/active damping.

Referring to FIG. 15, torque is plotted on the ordinate while time is plotted on the abscissa. In the case of diesel engines, because they operate with a high compression ratio, a diesel engine characteristically produces a positive torque along with a substantial pulsating component superimposed. This pulsating component tends to produce torsional oscillations, which are instabilities about a fundamental speed. A typical engine's undamped behavior is represented on the left side of the graph.

This is why most engines feature a flywheel, attached to the engine crankshaft, to resist torsional oscillations and reduce the severity of the torque pulsations. A flywheel achieves this purpose with its high inertia. The central part of the graph shows how engine torque is passively damped. According to the invention, the flywheel, and its associated inertia, can be replaced with the retarder and its generated inertia.

Because the invention can apply negative torque to a vehicle's drive shaft by use of a retarder, an engine's net torque pulses can be monitored and the retarder can be controlled to produce similar but opposite pulses to further reduce engine-induced oscillations.

The upper right side of FIG. 15 shows the resultant torque after the retarder is made to produce torque pulses as shown at the lower right. The active damper pulse train shown is sinusoidal. However, the pulses may be shaped by means of L/R ratios so that they may oppose the net torques almost exactly, to result in very low torque pulsations, although an undesirable side effect is to reduce the average torque.

As explained earlier, PMG 147 may be used as a motor to oppose, by pulsing, the negative portion of the residual torque as shown in b of FIG. 15. In such a case, the average torque is maximized, which has a beneficial effect on efficiency. Because PMG 147 is functioning as a generator most of the time, this technique may be employed only when the battery is fully charged and at a time when PMG 147 is not required to act as an alternator for the vehicle.

E. Embodiment #5 Electromagnetic Retarder/Transient Booster Combination

Figure 13:
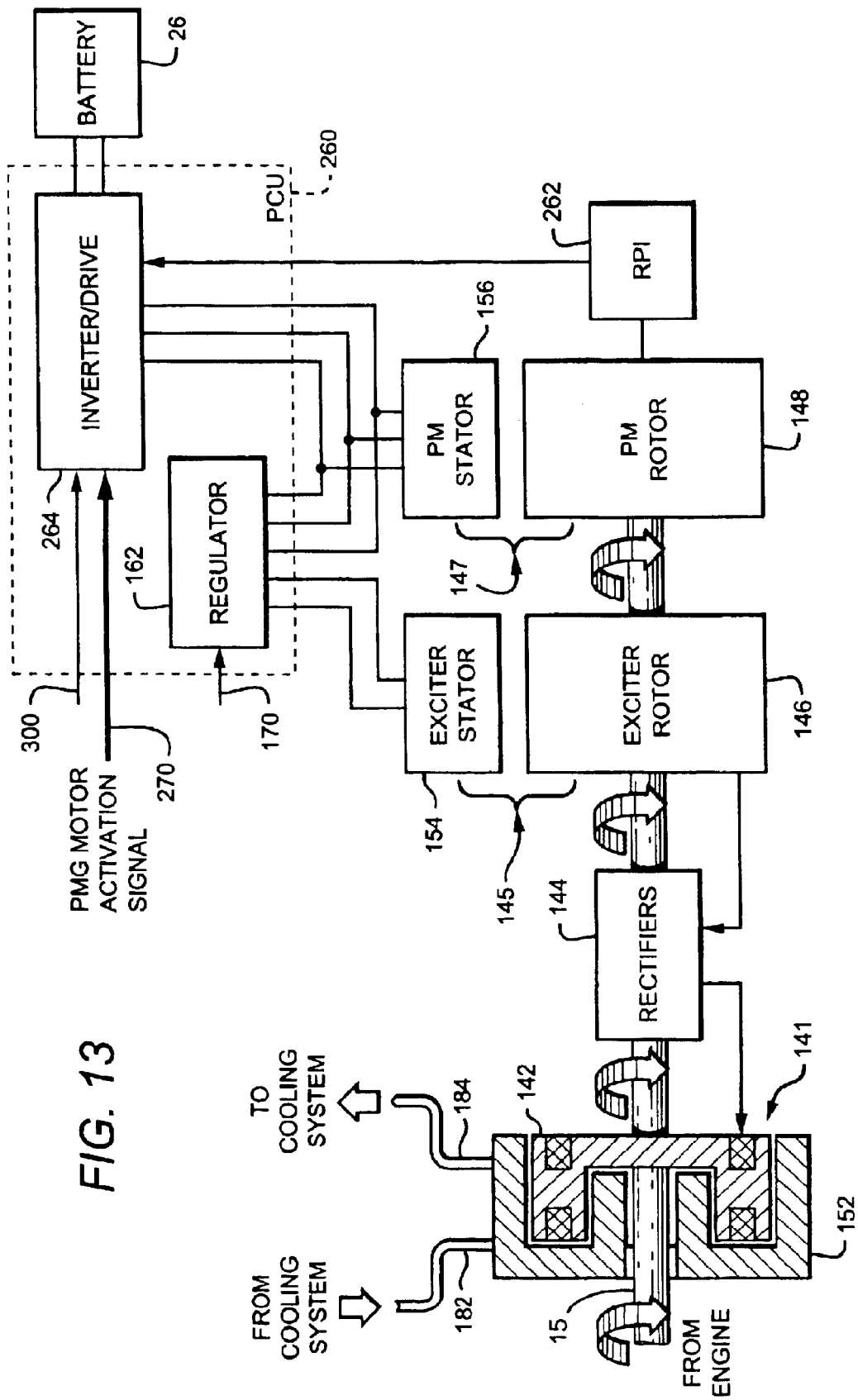
FIG. 13 is a block diagram of an alternative retarder system illustrating a retarder, starter, alternator and PMG booster combination as embodiment #5.
Figure 14:
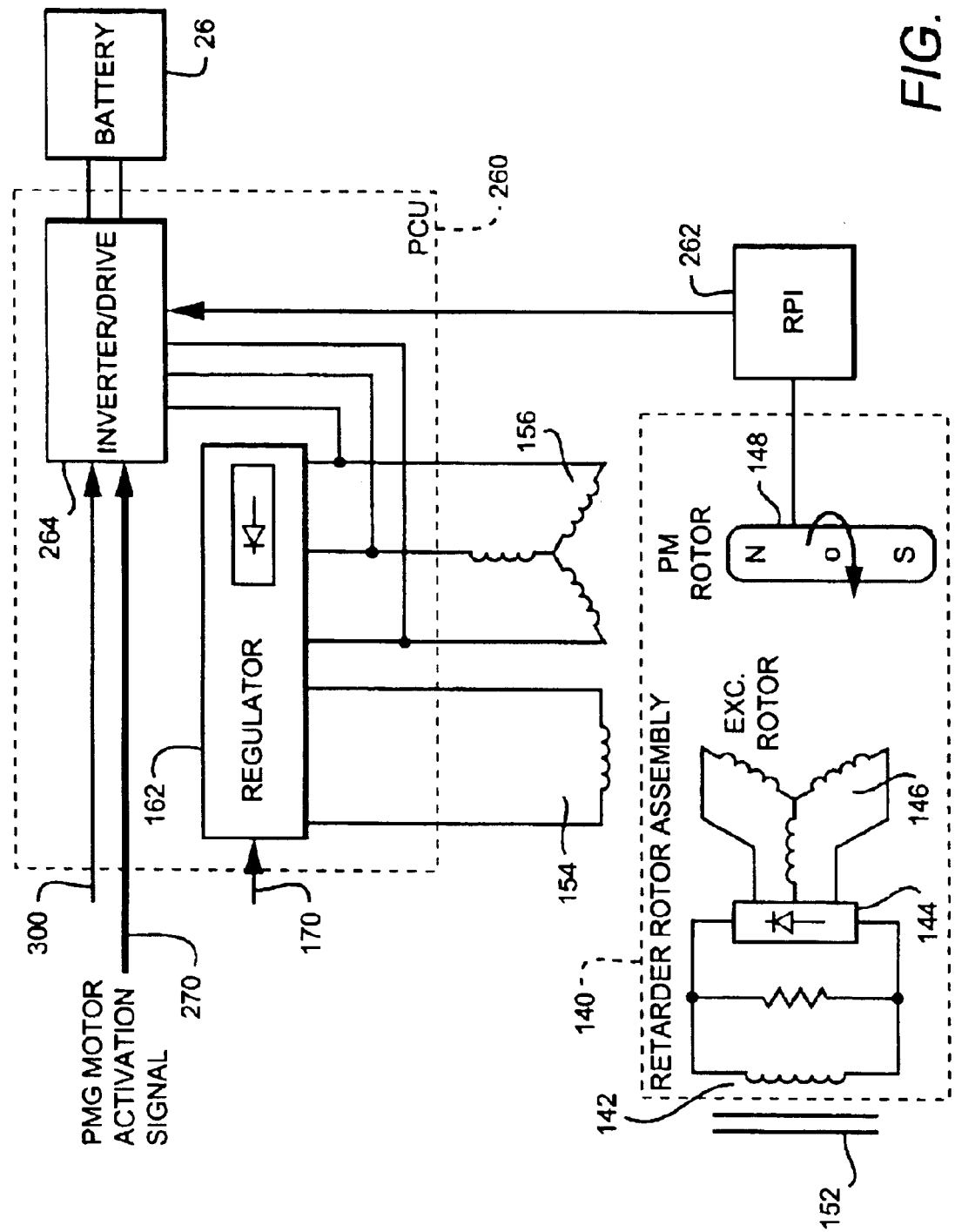
FIG. 14 is a schematic diagram of the retarder, starter, alternator and PMG booster combination illustrating embodiment #5.

FIG. 13 and FIG. 14 best illustrate embodiment #5 which utilizes the system described in embodiment #3 to also utilize PMG 147 as a transient engine booster. If PMG 147 is sufficiently upsized, it can be used to function as a transient engine booster, to overcome the common lag associated with turbo charging. This lag is encountered while the turbine is rather slowly accelerated to full speed. Using PMG 147 in this manner can minimize or eliminate the lag in vehicles having a turbo-charger. In response to receiving an external signal 270 to activate PMG 147 as a motor very similar to the way it is used as a starter described in embodiment #3, PMG 147 will therefore provide additional torque to the drivetrain thus increasing the drivetrain's rpm.

F. Other Considerations

Locating the retarder rotor assembly 240 in the engine flywheel housing becomes the preferred position for the retarder system, as it replaces the large flywheel, but continues to provide the additional functions as described above. The benefits of having a retarder system perform the additional functions described above include reduced cost, overall improved fuel efficiency and reliability.

Compared to the stand-alone devices such as the starter and alternator, the integrated retarder system described in embodiments #3–5 achieves cost savings because several of its constituents are used for multiple functions.

The main advantage for utilizing the active damping capability of the invention is to reduce mechanical stresses, which would extend the life of the transmission, differential, and other drive train components. This ability to actively dampen engine torsional oscillations, would require only the addition of a torque sensor, such as a strain gauge or other similar device.

G. Vehicular Operation

Having thus described each of the functions associated with the retarder system, the following is a brief description of the operation of the Integrated Retarder and Accessory Device (IRAAD) which utilizes all functions described herein:

A. The operator commands the engine to be started by the usual means of turning a key switch or depressing a button depicted as start signal 300 in FIG. 9. This action commands start inverter 264 to draw DC power from battery 26, invert it into three phases, and deliver it to PM stator 156 according to where the PM rotor 148 is positioned with respect to the stator 156. Depending upon how regulator 162 is configured, it may require a command not to pass current to exciter stator 154 when start signal 300 is received. RPI 262 enables PMG 147 to start the engine smartly, with minimum inrush current. It is well known that brush-type starters, because of their initial low resistance, can cause high initial or inrush currents, which are detrimental to the battery life. High inrush currents can be avoided by starting the engine with PMG 147 in combination with RPI 262.

B. With the engine thus started and running, PMG 147, now drawing mechanical power from rotating drive-shaft 15, reverts to a generate mode and supplies power to PCU 260 which rectifies the AC to DC and thereafter charges battery 26. The power supply responsible for recharging the battery may utilize the selected power devices used during the start mode. For the moment, retardation is not required and regulator 162 prevents current from being directed to exciter stator 154.

C. The firing order of the cylinders produces a substantial vibration, or torque pulses as shown in FIG. 15. The inertia of rotor assembly 140, or any residual flywheel, reduces those pulses somewhat. The residual vibration is sensed by a transducer placed in an appropriate location (not shown). The signal's amplitude and frequency characteristics 266 are delivered to PCU 260. If signal 266 is delivered to regulator 162, the regulator would provide a responsive current to exciter stator 154 to induce retarder 141 to pulse in a similar manner, but exactly out-of-phase. If signal 266 is delivered to inverter 264, the inverter would use battery 26 to energize PMG 147 to pulse in a similar manner, but exactly out-of phase. The two signals thus cancel each other, resulting in minimum drivetrain vibration and maximum net torque.

D. When the driver wishes to reduce speed by retardation, he removes his foot from the accelerator/gas pedal and activates retardation, by any one of a variety of means. A proportional or digitized retard signal 170 is thus received by the regulator 162 in PCU 260, which energizes the exciter control field with a responsive level of DC current according to the retard signal 170 received. Because exciter rotor 146 is rotating upon drive-shaft 15, the magnetic field of exciter generator 145 produces an AC voltage in exciter rotor 146. This AC voltage is rectified to DC by a set of rectifiers 144 which are hard-wired between the output of exciter rotor 146 and the input to main field winding 142. Because they are placed on drive-shaft 15, rectifiers 144 are termed "rotating" diodes. Retarder 141 thus becomes energized and main field winding 142 becomes attracted to induction ring 152 which, coupled with rotation of field winding 142 as a result of being coupled to rotating drive-shaft 15, causes power to be generated in the form of heat in induction ring 152 according to the relationship:

$$P=TN/5252$$

Where: P is power in HP

T is Torque in ft-lbs

N is Speed in RPM

E. The heat generated in induction ring 152 is transferred to cooling fluid entering from inlet 182 and exiting from outlet 184. As explained earlier, the now idling engine is adding little heat to the cooling system, which is able to dissipate the heat produced by retarder 141.

F. As the retarding cycle draws to a close, the magnetic field is reversed by a rotating field reversing switch (not shown) which serves to eliminate any residual magnetism which could reduce efficiency.

G. Once retardation is no longer required, active vibration damping resumes by pulsing the retarder 141 using regulator 162 according to the frequency and amplitude of the residual vibration. However, as soon as battery 26 becomes completely recharged, PMG 147 may be employed as a motor and used as an alternative to the retarder, for dampening the negative portion of the vibration cycles and thus result in a higher net usable torque upon receiving net torque signal 266. However, this technique may be used only intermittently, because it relies on the battery for power and tends to deplete it. Therefore, if PMG 147 is used as a motor for this purpose, it must periodically revert to a generate mode, to allow for recharging battery 26.

IRAAD Improvements

First Improvement—Combination Hydraulic-Electromagnetic Retarder

Figure 16:
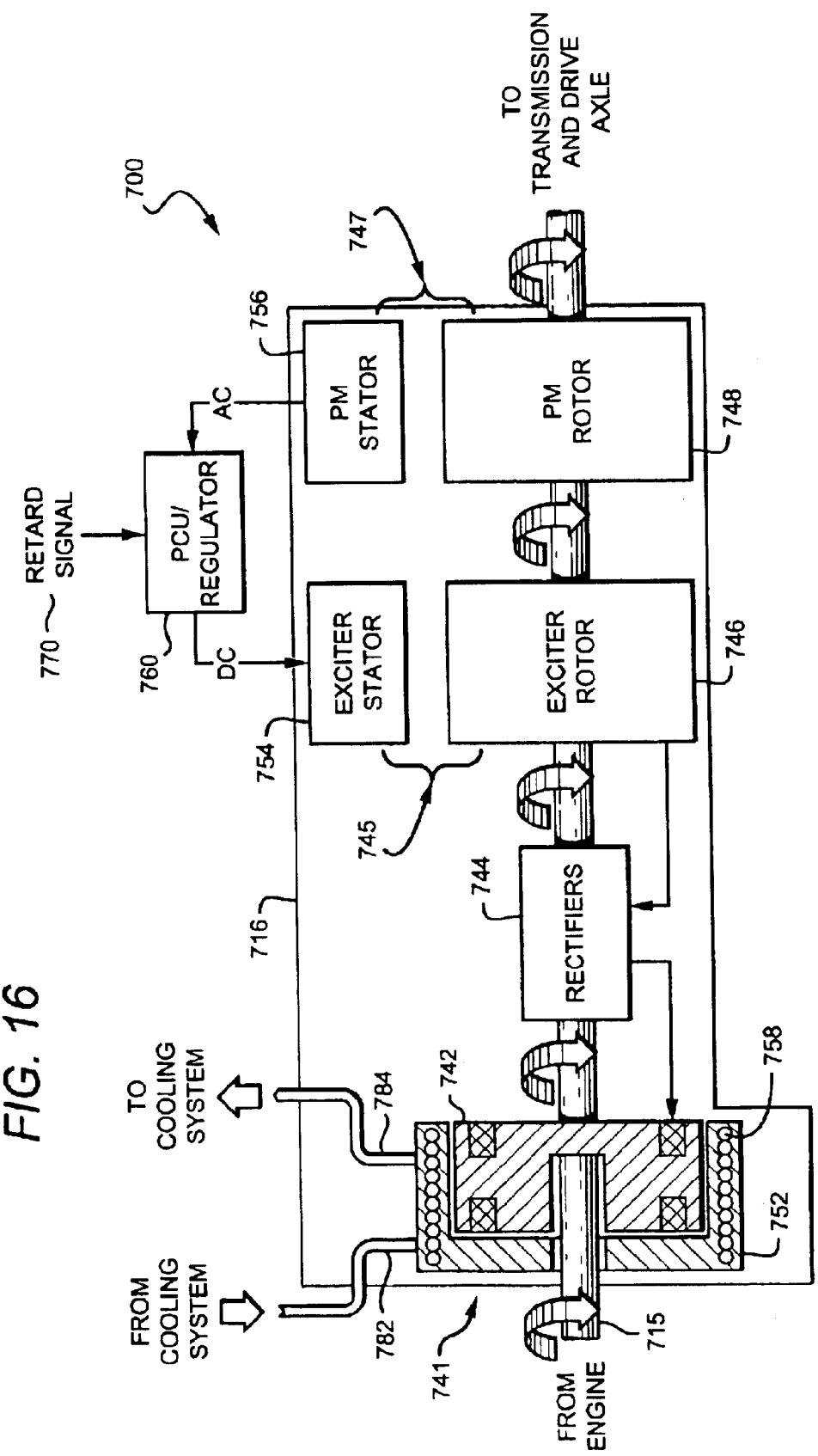
FIG. 16 is a block diagram of one embodiment of an IRAAD which incorporates a combination electromagnetic-hydraulic retarder.

The Hybrid electromagnetic/hydraulic retarder is shown generally at 700 in FIG. 16. FIG. 16 differs essentially from the retarder illustrated in FIG. 3 in that besides having the same type of cooling system; fluid entering the system at inlet 782, circulating through induction ring 752 by helical pathway 758 and exiting by outlet 784, there is an additional inlet and outlet for hydraulic fluid which not only is an additional means for cooling the retarder, but also serves to enhance retardation and lubricate the seals contained within the IRAAD which is best illustrated in FIG. 17.

Figure 17:
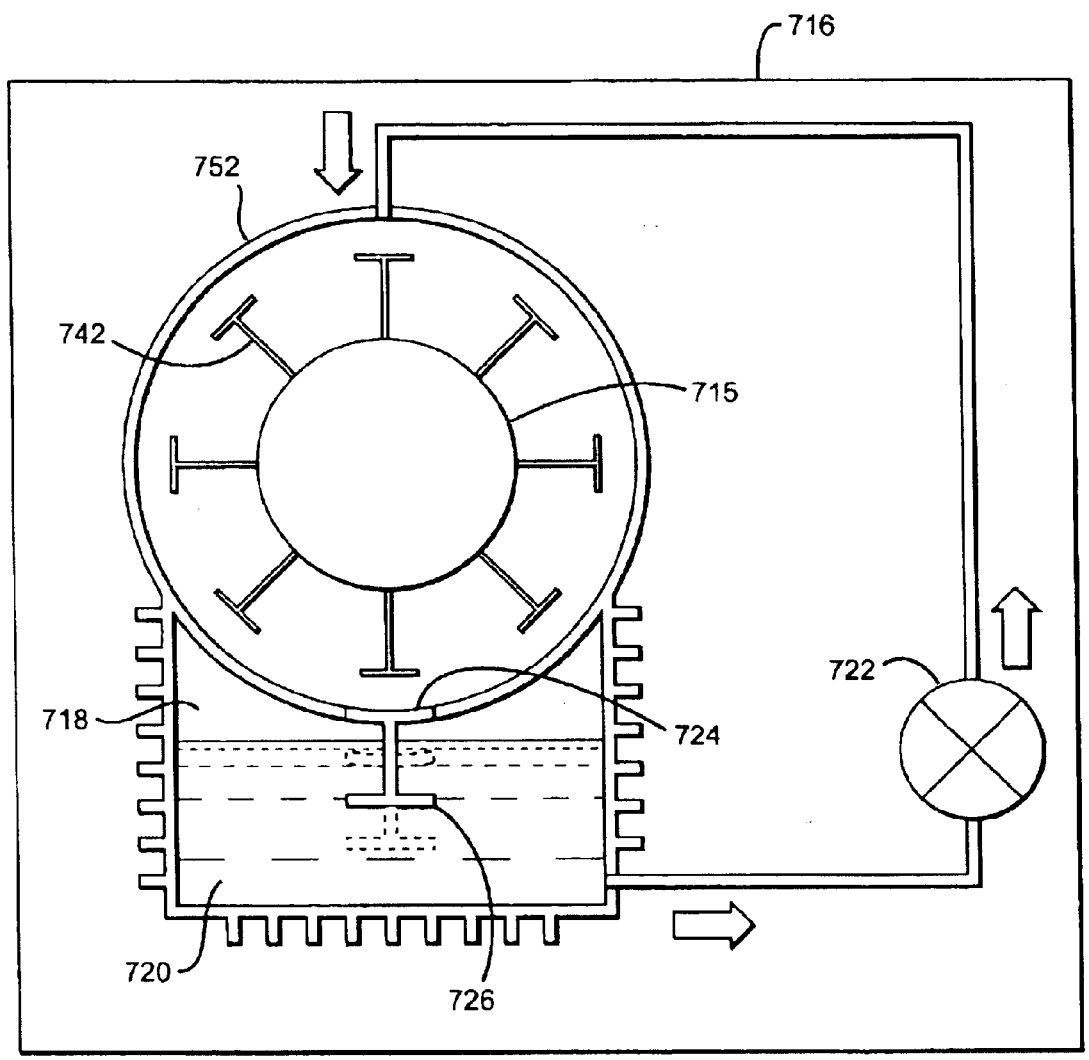
FIG. 17 is a schematic of the hydraulic fluid flow for FIG. 16.

FIG. 17 illustrates the flow path for the hydraulic fluid. The hybrid electromagnetic/hydraulic retarder comprises a salient-pole wound field rotor 742 which rotates within a water cooled induction ring 752 and overall housing 716. Within housing 716 is a reservoir 718 for hydraulic fluid 720.

A pump 722 is provided for circulating hydraulic fluid 720 into the space between rotor 742 and induction ring 752. This space can be referred to as an annular region or cavity. However, depending on the specific design utilized, the definition of cavity does not have to be limited to the area of the rotor and induction ring and can be expanded to include the space between the drive shaft 715 and housing 716.

Pump 722 can be coupled mechanically to the input shaft 715. Alternatively, pump 722 can be driven electrically by means of an auxiliary motor. Preferably, pump 722 is a centrifugal pump which can be designed so that its operating pressure is within acceptable limits of the system.

Pump 722 functions whenever retardation is commanded. The primary function of pump 722 is to circulate hydraulic fluid 720 from reservoir 718 into the cavity or annular region defined as the space between: a) the drivetrain and anything mechanically connected to the drivetrain; and, 2) housing 716 and anything mechanically connected to the inner wall of housing 716. By way of example, items mechanically connected to the drivetrain include rectifiers, the exciter rotor and the PM rotor. Similarly, items mechanically connected to the inner wall of housing 716 can include the exciter stator and PM stator.

While within the annular region, hydraulic fluid 720 absorbs the heat generated by the rotating field and thereafter exits or, is drained through port 724, back into reservoir 718. Reservoir 718 is designed to permit heat dissipation through its wall so at least one side should make up a portion of housing 716. Additionally, hydraulic fluid 720 is used to lubricate the bearings and seals.

However, when the required retardation exceeds the capacity of the electromagnetic portion of the device, port 724, which is normally open, is closed by operation of a solenoid or otherwise actuated valve 726, or other similar device to prevent the flow of hydraulic fluid 720 back into reservoir 718. Upon closure of port 724 by valve 726, the oil level in the annular region increases as a result of the continued operation of pump 722. This action increases the windage losses by the fluid shear factor, thereby increasing overall negative torque experienced by the vehicle. Operation of valve 726 and pump 722 is selective and maybe computer controlled to regulate the fluid pressure to obtain the desired rate of deceleration.

PMG Gear Ratio

Figure 18:
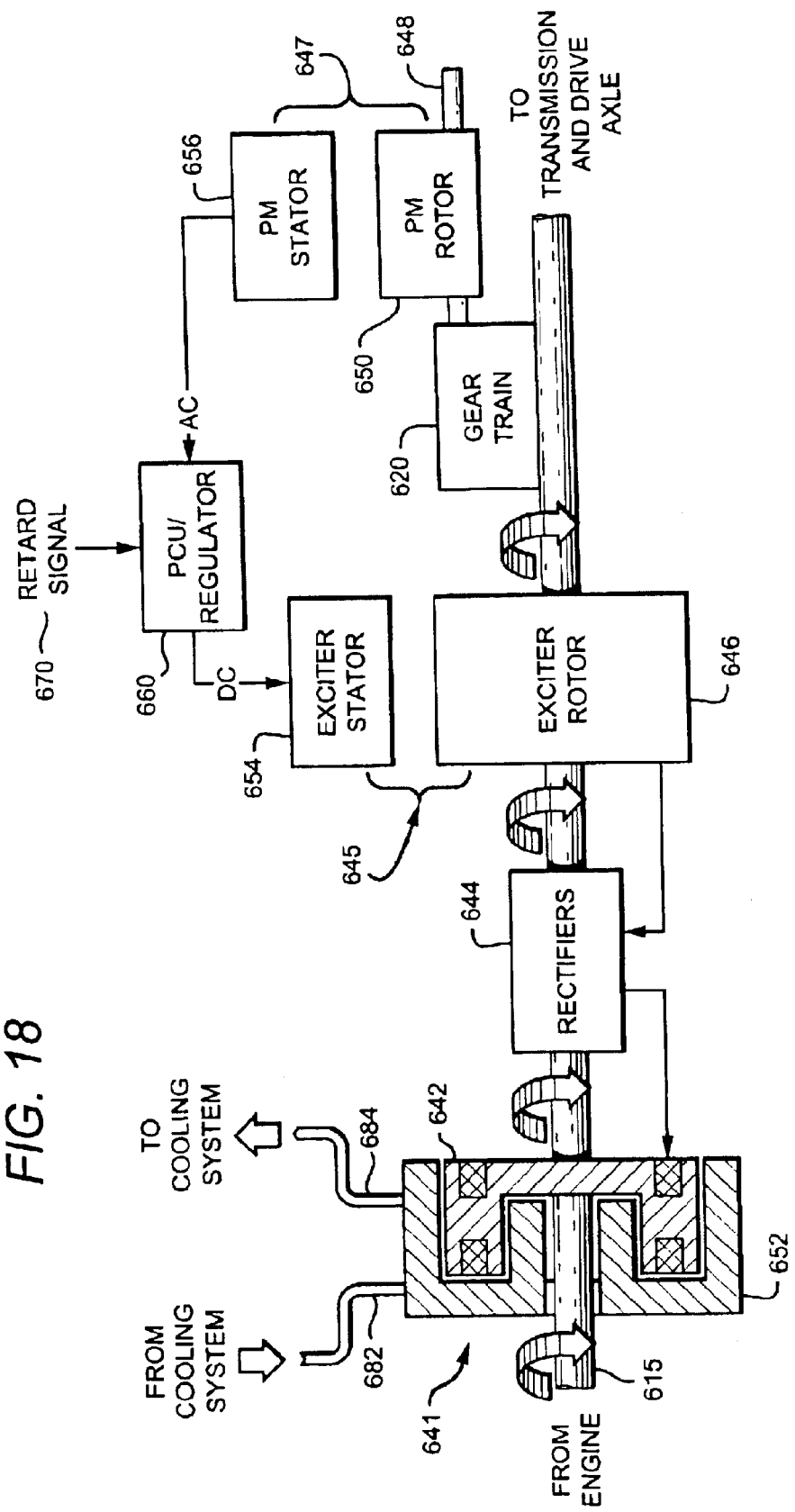
FIG. 18 is a block diagram of one embodiment of an IRAAD which incorporates a self-excited retarder incorporating a PMG Gear Ratio.

In another embodiment of the invention, rather than having the PM rotor 748 directly connected to drivetrain 715 as shown in FIG. 16, the PM rotor 650 is located on a secondary shaft 648 which is mechanically coupled to drivetrain 615 by gear train 620 as illustrated in FIG. 18

Locating PM generator 647 off drivetrain 615 offers the advantage that when utilized with a sufficiently sized geartrain 620, the size of PM generator 647 can be significantly reduced while still providing the necessary current to PCU/regulator 660. This results in a smaller unit also when used as a motor to start the engine or boost acceleration with energy stored in the batteries. PM generator 647 can also be designed to be, or not be incorporated within the same housing that supports the other parts of the IRAAD.

I claim:

1. A vehicle retarder system comprising:

a main drive shaft, and a housing structure supporting the main drive shaft;

a hydraulic electromagnetic retarder having a field winding secured to the main drive shaft in surrounding relation thereto, and an induction drum secured to the housing structure; the space between said housing structure and said main drive shaft defining a cavity;

a secondary drive shaft drivingly coupled to said main drive shaft by a gear train;

a permanent magnet generator having a permanent magnet rotor secured to said secondary drive shaft, and an output winding secured to the housing structure to provide an alternating output voltage responsive to rotation of the secondary drive shaft;

a retarder electronic circuit means, selectively operable for developing an output voltage and applying electrical energy from the permanent magnet generator to the electromagnetic retarder;

an exciter generator having a rotor secured to the drive shaft, and an output winding secured to the housing structure to provide an alternating output voltage, and a stator with an excitation winding secured to the housing structure;

a power control unit for receiving the alternating output voltage of the permanent magnet generator in order to power the excitation winding of the exciter generator, a controller for selectively controlling the power control unit so as to selectively energize the stator of the excitation generator from the output winding of the permanent magnet generator, rectifiers carried by the main drive shaft and rotating therewith, for rectifying the alternating output from the rotor of the exciter generator and applying the thus rectified output to the field winding of the retarder so as to produce an electromagnetic torque that slows the main drive shaft rotation; and, where said hydraulic-electromagnetic retarder further comprises a fluid circuit which can be operated upon demand to pump hydraulic fluid into and fill said cavity as necessary thus providing additional torque to supplement the electromagnetic torque generated.

2. The vehicle retarder system of claim 1 which further includes a battery recharge electronic circuit means selectively coupling the generator output to the battery for recharging the battery.

3. The vehicle retarder system of claim 1 further including a coolant system that is operatively coupled to the induction drum.

4. The vehicle retarder system of claim 2 further including a coolant system that is operatively coupled to the induction drum.

5. The vehicle retarder system of claim 1 which further includes a sensing means for sensing the net torque produced by the engine, and a first damper circuit means coupling the sensing means to the retarder electronic circuit means for utilizing the electromagnetic retarder as a torque damper.

6. The vehicle retarder system of claim 5 which further includes a battery recharge electronic circuit means selectively coupling the generator output to the battery for recharging the battery.

7. The vehicle retarder system of claim 5 further including a coolant system that is operatively coupled to the induction drum.

8. The vehicle retarder system of claim 6 further including a coolant system that is operatively coupled to the induction drum.

* * * * *